United States Patent
Wippermann et al.

(10) Patent No.: US 11,106,047 B2
(45) Date of Patent: Aug. 31, 2021

(54) MULTI-APERTURE IMAGING DEVICE, IMAGING SYSTEM AND METHOD FOR PROVIDING A MULTI-APERTURE IMAGING DEVICE

(71) Applicant: Fraunhofer-Gesellschaft zur Förderung der angewandten Forschung e.V., Munich (DE)

(72) Inventors: Frank Wippermann, Meiningen (DE); Andreas Brückner, Gröbenzell (DE); Jacques Duparré, Jena (DE); Alexander Oberdörster, Jena (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/663,444

(22) Filed: Oct. 25, 2019

(65) Prior Publication Data

US 2020/0057310 A1 Feb. 20, 2020

Related U.S. Application Data

(63) Continuation of application No. PCT/EP2018/062996, filed on May 17, 2018.

(30) Foreign Application Priority Data

May 23, 2017 (DE) ...................... 10 2017 208 709.9

(51) Int. Cl.
*H04N 5/225* (2006.01)
*G02B 27/10* (2006.01)
(Continued)

(52) U.S. Cl.
CPC ....... *G02B 27/106* (2013.01); *G02B 13/0065* (2013.01); *G02B 26/0816* (2013.01);
(Continued)

(58) Field of Classification Search
CPC .................................................. G02B 13/0065
See application file for complete search history.

(56) References Cited

U.S. PATENT DOCUMENTS

| 7,719,749 B1 * | 5/2010 | Minor ..................... F41H 5/266 |
| | | 359/267 |
| 10,054,837 B2 * | 8/2018 | Kim .................... H04N 5/23206 |

(Continued)

FOREIGN PATENT DOCUMENTS

| CN | 103210641 A | 7/2013 |
| CN | 103413748 A | 11/2013 |

(Continued)

OTHER PUBLICATIONS

Chinese Office Action, dated Nov. 25, 2020, in application No. 201880034071.X.

(Continued)

*Primary Examiner* — Gary C Vieaux
(74) *Attorney, Agent, or Firm* — McClure, Qualey & Rodack, LLP

(57) ABSTRACT

A multi-aperture imaging device includes an image sensor and an array of optical channels, wherein each optical channel includes an optic for imaging at least a part of a total field of view onto an image sensor region of the image sensor. The multi-aperture imaging device includes a beam-deflector including at least one beam-deflecting element for deflecting an optical path of an optical channel, wherein each optical channel is assigned a beam-deflecting element. The beam-deflecting element is configured to have a transparent state of a controllable surface based on first electric (Continued)

control and to have a reflecting state of the controllable surface based on a second electric control in order to deflect the optical path.

28 Claims, 12 Drawing Sheets

(51) Int. Cl.
    *G02B 13/00*     (2006.01)
    *G02B 26/08*     (2006.01)
    *G02B 27/64*     (2006.01)

(52) U.S. Cl.
    CPC ....... *G02B 26/0875* (2013.01); *G02B 27/646* (2013.01); *H04N 5/2254* (2013.01); *H04N 5/2259* (2013.01)

(56) References Cited

U.S. PATENT DOCUMENTS

| | | | |
|---|---|---|---|
| 10,334,172 | B2 | 6/2019 | Wippermann et al. |
| 10,365,480 | B2 * | 7/2019 | Laroia ................. G02B 17/008 |
| 10,425,567 | B2 | 9/2019 | Wippermann et al. |
| 10,732,377 | B2 | 8/2020 | Wippermann et al. |
| 2013/0033579 | A1 | 2/2013 | Wajs |
| 2013/0063614 | A1 | 3/2013 | Tsutsumi |
| 2014/0055624 | A1 * | 2/2014 | Gaines ..................... G02B 5/08 |
| | | | 348/207.1 |
| 2014/0204370 | A1 | 7/2014 | Rudmann et al. |
| 2015/0092102 | A1 * | 4/2015 | Chan .................... H04N 5/2254 |
| | | | 348/360 |
| 2016/0255330 | A1 | 9/2016 | Wippermann et al. |
| 2016/0360111 | A1 | 12/2016 | Thivent et al. |
| 2017/0118388 | A1 | 4/2017 | Wippermann et al. |
| 2017/0264825 | A1 | 9/2017 | Wippermann et al. |
| 2017/0276954 | A1 * | 9/2017 | Bajorins .............. G02B 27/149 |
| 2018/0172945 | A1 * | 6/2018 | Wippermann ..... G02B 26/0875 |
| 2018/0176437 | A1 | 6/2018 | Wippermann et al. |
| 2018/0176471 | A1 | 6/2018 | Wippermann et al. |
| 2018/0176472 | A1 | 6/2018 | Wippermann et al. |
| 2018/0176473 | A1 | 6/2018 | Wippermann et al. |
| 2018/0184068 | A1 | 6/2018 | Wippermann et al. |
| 2018/0198963 | A1 | 7/2018 | Wippermann et al. |
| 2018/0241920 | A1 | 8/2018 | Wippermann et al. |
| 2019/0068950 | A1 | 2/2019 | Wippermann et al. |
| 2019/0132500 | A1 * | 5/2019 | Slama ................ G02B 27/1066 |

FOREIGN PATENT DOCUMENTS

| | | | | |
|---|---|---|---|---|
| CN | 103842790 | A | 6/2014 | |
| CN | 106444056 | A | 2/2017 | |
| DE | 10 2014 213371 | B3 | 8/2015 | |
| DE | 10 2015 215 837 | A1 | 2/2017 | |
| DE | 10 2015 215 841 | A1 | 2/2017 | |
| DE | 10 2015 215 845 | A1 | 2/2017 | |
| DE | 102015215837 | A1 | 2/2017 | |
| DE | 102015215845 | A1 * | 2/2017 | ............... G02B 7/08 |
| DE | 102015215845 | A1 | 2/2017 | |
| EP | 2 690 485 | A1 | 1/2014 | |
| EP | 3 058 713 | B1 | 1/2021 | |
| JP | 2004-258398 | A | 9/2004 | |
| JP | 2005-274630 | A | 10/2005 | |
| JP | 2013-062626 | A | 4/2013 | |
| JP | 2013-171110 | A | 9/2013 | |
| JP | 2014-041332 | A | 3/2014 | |
| JP | 2016-541151 | A | 12/2016 | |
| JP | 2017-060107 | A | 3/2017 | |
| TW | 201711443 | A | 3/2017 | |
| WO | 2016/033452 | A1 | 3/2016 | |
| WO | 2016033452 | A1 | 3/2016 | |
| WO | WO-2016033452 | A1 * | 3/2016 | ............. G03B 35/10 |
| WO | 2017/029376 | A1 | 2/2017 | |
| WO | 2017/029380 | A1 | 2/2017 | |

OTHER PUBLICATIONS

Examination Report, dated Dec. 9, 2020, in the parallel European patent application No. 18728324.7.
English translation of Chinese Office Action, dated Nov. 25, 2020, in application No. 201880034071.X.
International Search Report and Written Opinion dated Aug. 30, 2018, issued in application No. PCT/EP2018/062996.
English language translation of International Search Report.
"Liquid Crystal Switchable Mirror;" http://www.kentoptroncis.com/specs/Transflector.pdf, printout of website accessed Nov. 2019; pp. 1-2.
Please be advised that U.S. Pat. No. 10,425,567 (B2) is the U.S. counterpart to DE 10 2014 213371 (B3).
Japanese language office action dated Mar. 31, 2021, issued in application No. JP 2019-564981.
English language translation of Japanese Office Action dated Mar. 31, 2021, issued in application No. JP 2019-564981.

* cited by examiner

MULTI-APERTURE IMAGING DEVICE, IMAGING SYSTEM AND METHOD FOR PROVIDING A MULTI-APERTURE IMAGING DEVICE

CROSS-REFERENCE TO RELATED APPLICATIONS

This application is a continuation of copending International Application No. PCT/EP2018/062996, filed May 17, 2018, which is incorporated herein by reference in its entirety, and additionally claims priority from German Application No. 10 2017 208 709.9, filed May 23, 2017, which is also incorporated herein by reference in its entirety.

BACKGROUND OF THE INVENTION

The present invention relates to a multi-aperture imaging device, to an imaging system and to a method for providing a multi-aperture imaging device. The present invention further relates to viewing direction switching in an array line camera by means of an electrically switchable mirror such as a liquid crystal mirror, and in particular to viewing direction switching without mechanically movable parts.

Conventional cameras have an imaging channel that images the entire object field. Multi-aperture imaging devices may image the object field by means of several partial fields of view. There are concepts which, by using a beam-deflecting system such as a mirror, enable deflecting a viewing direction of the camera channels from the device plane to another direction of the overall system, e.g., approximately perpendicular thereto. For example, in the application case of a mobile phone, this perpendicular deflection may occur in a direction of the face of the user or in a direction of the surrounding area in front of him and may substantially occur by means of switchable folding mirrors.

A multi-aperture imaging device, an imaging system and a method for providing a multi-aperture imaging device that enable a mechanically robust concept would be desirable.

Thus, it is an object of the present invention to provide a multi-aperture imaging device, an imaging system and a method for providing a multi-aperture imaging device that enable a compact and at once mechanically robust design of the multi-aperture imaging device.

SUMMARY

According to an embodiment, a multi-aperture imaging device may have: an image sensor; an array of optical channels, wherein each optical channel includes an optic for imaging at least a part of a total field of view onto an image sensor region of the image sensor; and a beam-deflecting means including at least one beam-deflecting element with a controllable surface for deflecting an optical path of an optical channel, wherein each optical channel is assigned a beam-deflecting element, wherein the beam-deflecting element is configured to have a transparent state of the controllable surface based on a first electric control and have a reflecting state of the controllable surface based on a second electric control in order to deflect the optical path.

According to another embodiment, a multi-aperture imaging device may have: an image sensor; an array of optical channels, wherein each optical channel includes an optic for imaging at least a part of a total field of view onto an image sensor region of the image sensor; and a beam-deflecting means including at least one beam-deflecting element with a controllable surface for deflecting an optical path of an optical channel, wherein each optical channel is assigned a beam-deflecting element; wherein the beam-deflecting element is configured to have a transparent state of the controllable surface based on a first electric control and have a reflecting state of the controllable surface based on a second electric control in order to deflect the optical path; wherein the controllable surface is a first controllable surface, wherein the beam-deflecting element has a second controllable surface that is controllable into the transparent state and the reflecting state, wherein the first and the second controllable surfaces are arranged at an angle of at least 10° and at most 170° towards each other; and wherein the beam-deflecting element includes a first, a second, a third and a fourth prism having a triangular basal shape, wherein the first controllable surface is formed including a first surface element and a second surface element, wherein the second controllable surface is formed including a third surface element and a fourth surface element, wherein each of the first to fourth surface elements is arranged at a prism surface of one of the first to fourth prisms and the prisms are arranged such that the first and the second surface elements form the first controllable surface and the third and the fourth surface elements form the second controllable surface.

According to another embodiment, a method for providing a multi-aperture imaging device may have the steps of: providing an image sensor; providing an array of optical channels so that each optical channel includes an optic for imaging at least a part of a total field of view onto an image sensor region of the image sensor; arranging a beam-deflecting means including at least one beam-deflecting element having a controllable surface for deflecting an optical path of an optical channel so that each optical channel is assigned a beam-deflecting element; so that the beam-deflecting element is configured to have a transparent state of a controllable surface based on a first electric control and to have a reflecting state of the controllable surface based on a second electric control in order to deflect the optical path.

According to still another embodiment, a method for providing a multi-aperture imaging device may have the steps of: providing an image sensor; providing an array of optical channels so that each optical channel includes an optic for imaging at least a part of a total field of view onto an image sensor region of the image sensor; arranging a beam-deflecting means including at least one beam-deflecting element having a controllable surface for deflecting an optical path of an optical channel so that each optical channel is assigned a beam-deflecting element; so that the beam-deflecting element is configured to have a transparent state of a controllable surface based on a first electric control and to have a reflecting state of the controllable surface based on a second electric control in order to deflect the optical path; so that the controllable surface is a first controllable surface, wherein the beam-deflecting element has a second controllable surface which is controllable into the transparent state and the reflecting state, wherein the first and the second controllable surfaces are arranged at an angle of at least 10° and at most 170° towards each other; and so that the beam-deflecting element includes a first, a second, a third and a fourth prism having a triangular basal shape, wherein the first controllable surface is formed including a first surface element and a second surface element, wherein the second controllable surface is formed including a third surface element and a fourth surface element wherein each of the first to fourth surface elements is arranged at a prism surface of one of the first to fourth prisms, and wherein the prisms are arranged such that the first and the second surface elements form the first controllable surface and the third and the fourth surface elements form the second controllable surface.

It is one finding of the present invention to have recognized that the above object may be solved by carrying out viewing direction switching by means of a beam-deflecting element which is electrically controllable and may alternatively have a transparent state and a reflecting state so that the deflection of the viewing direction may be carried out by an electric control. This enables the substitution of mechanically moved beam-deflecting mirrors, which enables a high mechanical robustness while at the same time maintaining the compact design.

According to an embodiment, a multi-aperture imaging device includes an image sensor, an array of optical channels, wherein each optical channel includes an optic for imaging at least a part of a total field of view onto an image sensor region of the image sensor. The multi-aperture imaging device further includes a beam-deflecting means including at least one beam-deflecting element with a controllable surface for deflecting an optical path of an optical channel, wherein each optical channel is assigned a beam-deflecting element. The beam-deflecting element is configured to comprise a transparent state of the controllable surface based on a first electric control and to comprise a reflecting state of the controllable surface based on a second electric control in order to deflect the optical path.

According to a further embodiment, the beam-deflecting means includes at least one mirror element, wherein each optical channel is assigned a mirror element, arranged such that the beam-deflecting means deflects, in the transparent state of the controllable surface, the optical path with the mirror element. For example, this may be the optical path that has passed through the electrically controllable beam-deflecting element in the transparent state and subsequently strikes the mirror element. This enables deflection in two directions that are arbitrarily oriented towards each other, e.g., 180°, by using only one controllable beam-deflecting element.

According to a further embodiment, the beam-deflecting element is a first beam-deflecting element, wherein each optical channel is assigned a second beam-deflecting element of the beam-deflecting means that is arranged such that the optical path of the optical channel strikes the second beam-deflecting element in the transparent state of the first beam-deflecting element. This means that two beam-deflecting elements may be arranged in series one after another along the optical paths. This enables beam deflection along two directions while avoiding classical mirrors and/or enables a beam-deflection along three directions, e.g., if both beam-deflecting elements simultaneously comprise the transparent state.

According to a further embodiment, the beam-deflecting element comprises a first actively controllable surface and a second actively controllable surface that are controllable into the transparent state and the reflecting state. The first and second controllable surfaces are arranged towards each other at an angle of at least 10° and at most 170°. This enables the combination of two beam-deflecting elements in a single beam-deflecting element and an adjustment of the direction deflections in the beam-deflecting element.

According to a further embodiment, the first controllable surface is arranged in a first diagonal surface of a beam-deflecting element body, e.g., a cube or the like, and the second controllable surface is arranged in a second diagonal surface of the beam-deflecting element body. This enables the beam-deflecting element to be assembled by individual components whose outer edges form the diagonal surfaces of the total body.

According to an embodiment, the first controllable surface and the second controllable surface are arranged in an inclined manner towards each other around an axis that is arranged in parallel to a line-extension direction of the array. By means of the inclination of the controllable surfaces towards each other, a difference in the viewing direction may be set by switching the beam-deflecting elements.

According to an embodiment, the angle comprises 90° in a tolerance range of 10%. This enables switching between different viewing directions at an angle of approximately 180°.

According to an embodiment, the beam-deflecting element includes a first, a second, a third and a fourth prism having a triangular basal area, wherein the first controllable surface is formed including a first surface element and a second surface element, wherein the second controllable surface is formed including a third surface element and a fourth surface element. Each of the first to fourth surface elements is arranged at a prism surface of one of the first to fourth prisms. The prisms are arranged such that the first and second surface elements form the first controllable surface and the third and the fourth surface elements form the second controllable surface. This enables obtaining a prism body whose diagonal surfaces are formed by the controllable surfaces of the beam-deflecting element. This enables obtaining a beam-deflecting element having high optical quality.

According to an embodiment, the first surface element includes a first layer stack that provides switching between the transparent state and the reflecting state. An order of layers in the first layer stack is complimentary to an order of layers in a second layer stack of the second surface element. This enables a homogenous and uniform layer order in the first controllable surface, e.g., if the layers have a different orientation towards each other due to joining the prisms, e.g., twisted by 180°.

According to an embodiment, the beam-deflecting element includes a controllable surface that is controllable into the reflecting state and the transparent state. The beam-deflecting means includes a plurality of beam-deflection elements arranged along a line-extension direction of the array. The controllable surfaces of the plurality of beam-deflecting elements are arranged in an inclined manner towards each other in the beam-deflecting means so that the optical channels are deflected in different partial fields of view of a mutual total field of view. This enables capturing a large-area in the form of the total field of view and at the same time a substantially parallel orientation of the optical paths between the image sensor and the beam-deflecting means, which enables a simple and highly precise production.

According to an embodiment, the beam-deflecting means includes a plurality of identically formed beam-deflecting elements along a line-extension direction along which the optical channels are arranged in the array. The plurality of beam-deflecting elements is arranged rotated towards each other along the line-extension direction. This enables determining the directions into which the optical channels are deflected by determining the rotation angle, which is easily possible.

According to a further embodiment, the multi-aperture imaging device includes a focusing means having at least one actuator for setting a focus of the multi-aperture imaging device. The actuator is configured to provide a relative movement between one of the optics and the image sensor. This enables obtaining high quality pictures by means of a changeable focus.

According to an embodiment, a first optic of a first optical channel comprises a first focal length and a second optic of a second optical channel comprises a second focal length. The first focal length deviates from the second focal length by at least 10%. This enables different opening angles in the imaged partial or total fields of view.

According to an embodiment, a first group with at least one optical channel including optics having the first focal length is configured to image a first total field of view. A second group with at least one optical channel including optics having the second focal length is configured to image a second total field of view. Due to the interaction of different focal lengths, different total fields of view may be imaged.

According to an embodiment, a multi-aperture imaging device includes an optical image stabilizer mutually acting for two, a multitude of or all optical paths of the optical channels for an optical image stabilization along a first image axis and a second image axis by generating a relative movement between the image sensor and the array. The translational relative movement runs in parallel to a first image axis and a second image axis of an image captured by the multi-aperture imaging device. This enables obtaining images having a high quality by using an optical image stabilization.

According to an embodiment, the multi-aperture imaging device includes an electronic image stabilizer acting for two, a multitude of or all optical paths of the optical channels for an electronic image stabilization along a first image axis and the second image axis. The electronic image stabilizer may be arranged alternatively or additional to the optical image stabilizer. For example, the focal lengths of the optics may differ deliberately or unintentionally so that the optical image stabilization acts differently in different optical channels. This different effect may be reduced or compensated by additionally applying an electronic image stabilizer. Alternatively, the application of an electronic image stabilizer enables a channel-individual image stabilization so the use of an optical image stabilizer may be omitted.

According to an embodiment, the electronic image stabilizer is configured to execute a channel-individual electronic image stabilization in each channel according to a set functional connection depending on a relative movement between the image sensor and the array obtained by the optical image stabilization and/or focusing. If the optical characteristics and/or the executed relative movement are known, an effect in the images of the optical channels may be known in advance, which may be compensated by the electronic image stabilizer, so that a high quality of the images may be obtained.

According to an embodiment, a multi-aperture imaging device includes a control means for alternately controlling the beam-deflecting element into the transparent state and into the reflecting state based on a user input.

According to a further embodiment, an imaging system includes a first and a second multi-aperture imaging device configured to capture a total field of view at least partially in a stereoscopic manner.

According to a further embodiment, a method for providing a multi-aperture imaging device includes providing an image sensor, providing an array of optical channels so that each optical channel includes an optic for imaging at least a part of a total field of view onto an image sensor region of the image sensor. The method includes arranging a beam-deflecting means including at least one beam-deflecting element with a controllable surface for deflecting an optical path of an optical channel so that each optical channel is assigned a beam-deflecting element. The method is executed such that the beam-deflecting element is configured to comprise a transparent state of the controllable surface based on a first electric control and to comprise a reflecting state of the controllable surface based on a second electric control in order to deflect the optical path.

BRIEF DESCRIPTION OF THE DRAWINGS

Embodiments of the present invention are subsequently described with reference to the accompanying figures, in which.

DETAILED DESCRIPTION OF THE INVENTION

Figure 1A:
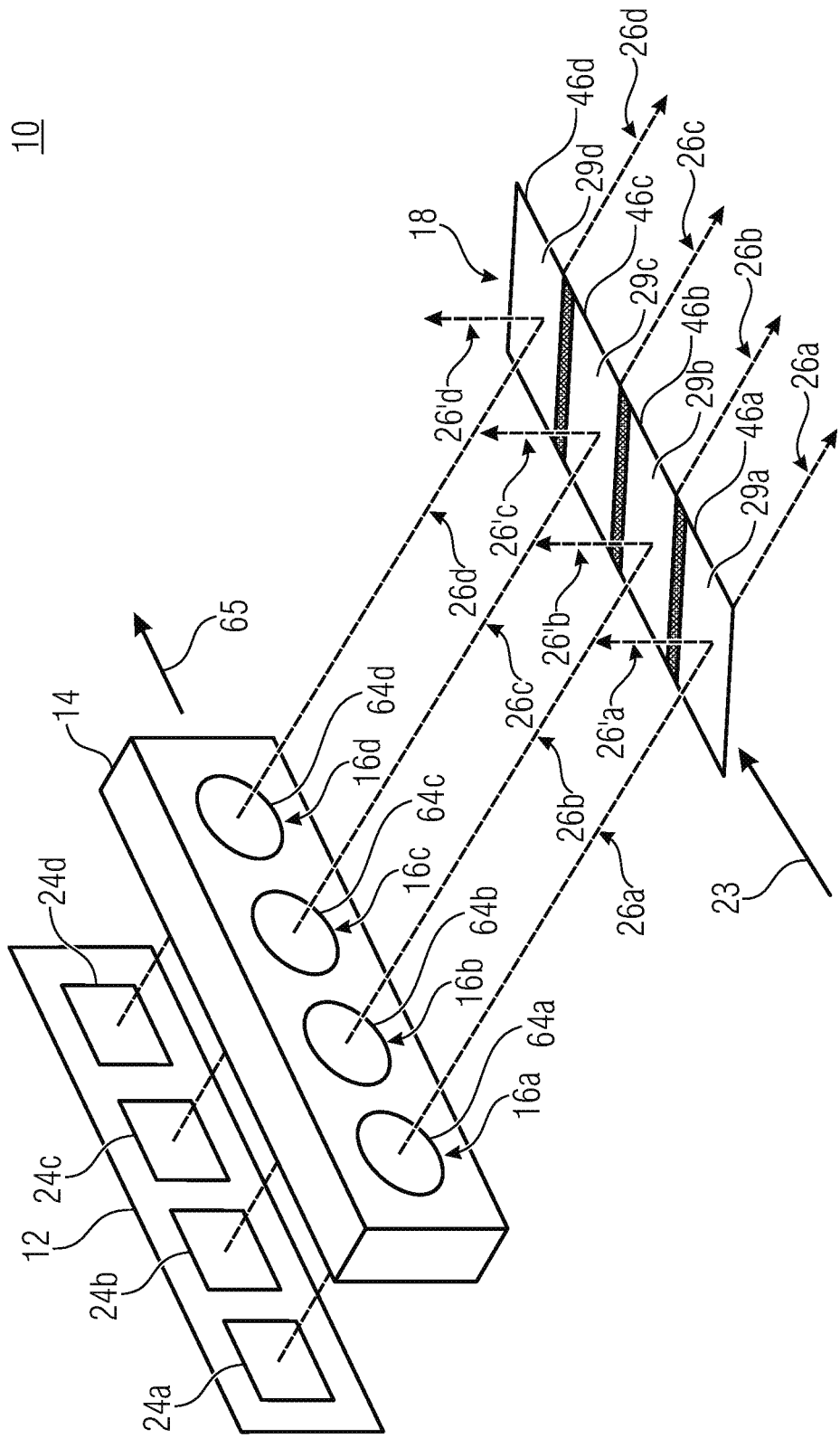
FIG. 1a shows a schematic perspective view of a multi-aperture imaging device according to an embodiment.

Before embodiments of the present invention will subsequently be described in detail with reference to the drawings, it shall be pointed out that identical, functionally identical and operatively identical elements, objects and/or structures are provided in the different figures with identical reference numerals so that the description of these elements in different embodiments is interchangeable and/or mutually applicable.

FIG. 1a shows a schematic perspective view of a multi-aperture imaging device 10 according to an embodiment. The multi-aperture imaging device 10 includes an image sensor 12, an array 14 of optical channels 16a to 16d and a beam-deflecting means 18. Each optical channel 16a to 16d includes an optic 64a, 64b, 64c and 64d, respectively, for imaging at least part of a total field of view onto an image sensor region 24a, 24b, 24c and 24d, respectively, of the image sensor 12.

The beam-deflecting means 18 includes a plurality of beam-deflecting elements 46a to 46d. Each optical channel may be assigned a beam-deflecting element 46a to 46d, which means that one or several optical channels may be deflected by a beam-deflecting element 46a to 46d. The beam-deflecting elements 46a to 46d are configured to comprise an optical state that is changeable based on an electric control 23. For this, each beam-deflecting element may comprise a controllable surface 29a-d comprising a transparent state and/or a reflecting state based on an electric control. A first state may be a substantially transparent state, at least in the wavelength range that is relevant for the multi-aperture imaging device, e.g., visible light. For example, the transparent state may comprise a photonic transmittance of at least 50%, at least 70% or at least 80% at least in a relevant view angle range such as 0° to 70°, 0° to 60° or 0° to 50°. In a second state, the beam-deflecting element may substantially be formed to be reflecting. This means that light is reflected in the relevant wavelength range and in the relevant view angle range to an extent of at least 50%, at least 70% or at least 80%. Examples for elements comprising such a functionality are mirrors using a liquid crystal base, e.g., as distributed by KENTOPTRONICS.

Now, the controllability in the reflecting or transmitting state enables that, in the reflecting state, optical paths 26a to 26d of the optical channels 16a to 16d are deflected by the beam-deflecting elements 46a to 46d, as illustrated by the optical paths 26'a to 26'd. In the transparent state, the optical paths 26a to 26d may substantially pass the beam-deflecting elements 46a to 46d unimpededly, wherein a low deflection or scattering is possible due to surface effects of the beam-deflecting elements 46a to 46d.

The multi-aperture imaging device 10 enables switching between two viewing directions along the optical paths 26a to 26d and 26'a to 26'd based on the electric control 23. The electric control 23 may occur out such that each of the beam-deflecting elements 46a to 46d is individually controllable, which means that some of the optical channels 16a to 16d may be deflected and other optical channels may remain undeflected. The multi-aperture imaging device 10 may be implemented such that the beam-deflecting elements 46a to 46d may be controllable and/or may be controlled in a mutual manner during a desired change from one operating state to another, i.e., tuned with respect to each other. For example, this means that all optical paths are simultaneously deflected (26'a to 26'd) or undeflected (26a to 26d).

Although the multi-aperture imaging device 10 is illustrated such that it comprises four optical channels imaging a total field of view onto four image sensor regions 24a to 24d by imaging partial fields of view and, to this end, comprises a beam-deflecting means having four beam-deflecting elements 46a to 46d, the multi-aperture imaging device may comprise any other number of optical channels, e.g., at least two, at least three, at least four, at least ten or at least 20. The beam-deflecting means 18 may comprise a corresponding or a lower number of beam-deflecting elements for deflecting into a direction of the optical paths 26'a to 26'd. Alternatively, two or more optical channels may comprise a mutual beam-deflecting element so that a lower number of beam-deflecting elements 46a to 46d may be sufficient.

Although the array 14 is illustrated including one line along the line-extension direction 65, the array 14 may also comprise a higher number of lines such as at least two, at least three or more.

Figure 1B:
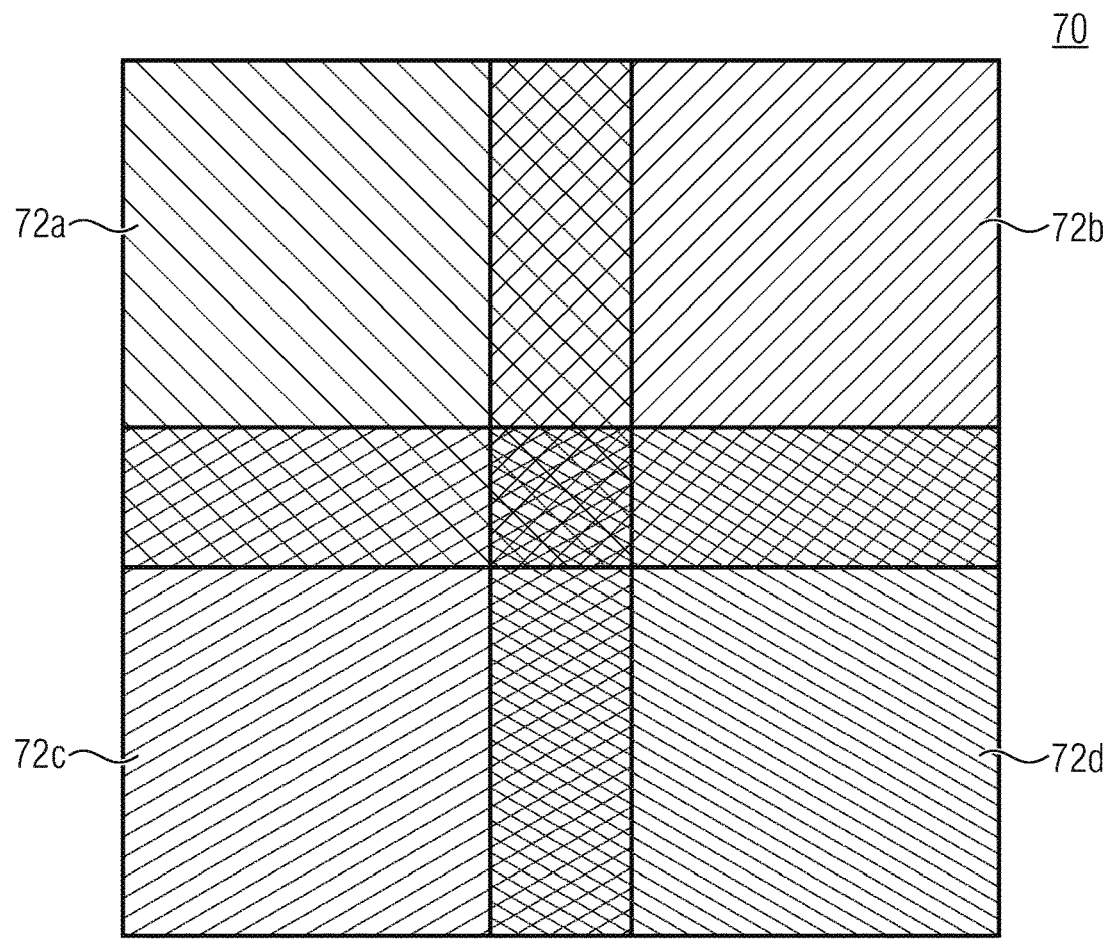
FIG. 1b shows a schematic illustration of a total field of view as may be captured by the multi-aperture imaging device according to FIG. 1a, according an embodiment.

FIG. 1b shows a schematic illustration of a total field of view 70 as may be captured by the multi-aperture imaging device 10, for example. Each of the optical channels 16a to 16d may be configured to capture a partial field of view 72a, 72b, 72c or 72d of the total field of view 70, wherein the partial fields of view 72a to 72d may overlap with each other. The arrangement of the partial fields of view 72a to 72d is only to be understood as an example and may be changed at will. A different number of optical channels 16a to 16d in the multi-aperture imaging device 10 may lead to a different number of partial fields of view 72a to 72d in the total field of view 70. Alternatively or additionally, it is also possible that the multi-aperture imaging device 10 comprises optical channels that image a partial field of view 72a to 72d twice, i.e., at least stereoscopically or in even higher numbers. For example, a number of four optical channels 16a to 16d may be implemented such that two partial fields of view are each captured twice for obtaining stereo information.

Figure 1C:
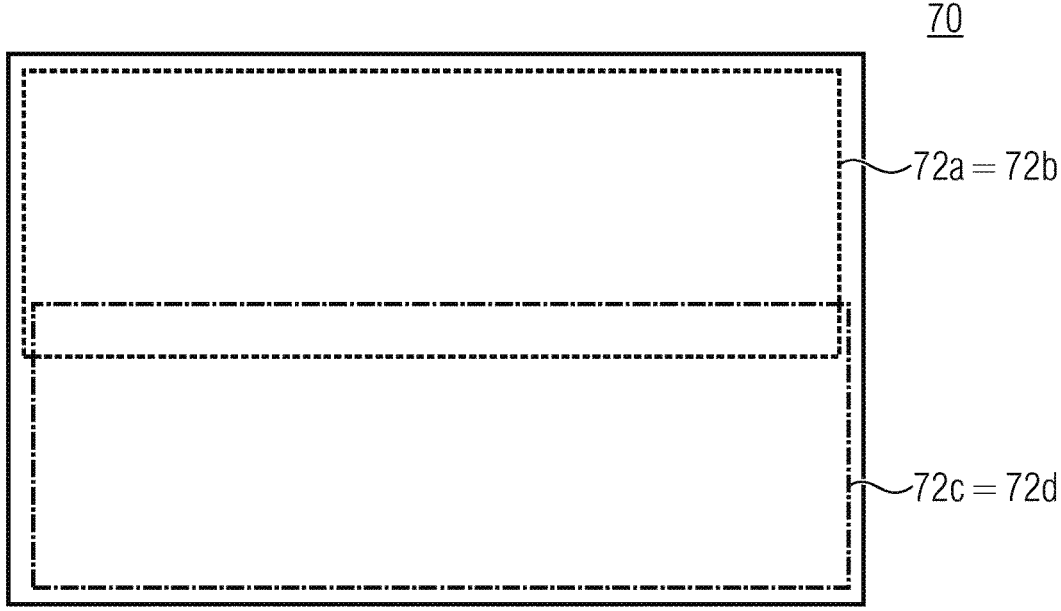
FIG. 1c shows a schematic illustration of the total field of view of FIG. 1b, which is entirely imaged by two partial fields of view and is captured by four optical channels in a stereoscopic manner.

FIG. 1c shows a schematic illustration of the total field of view 70, which is entirely imaged by two partial fields of view, e.g., 72a and 72c, 72a and 72d, 72b and 72c or 72b and 72d, wherein two, or alternatively more, optical channels are respectively configured to capture a substantially identical partial field of view 72a/72b or 72c/72d. In this case, substantially identical means that the partial fields of view overlap by at least 80%, at least 90% or at least 95%, e.g., 99%, while deviations from each other may occur, e.g., due to disparities. The assignment of the optical channels 16a to 16d of the multi-aperture imaging device 10 to the partial fields of view 72a to 72d may be arbitrary. For example, the optical channels 16a and 16c as well as the optical channels 16b and 16d may each capture the same partial field of view, which enables an equal base distance between two optical channels capturing the same partial field of view.

Figure 2:
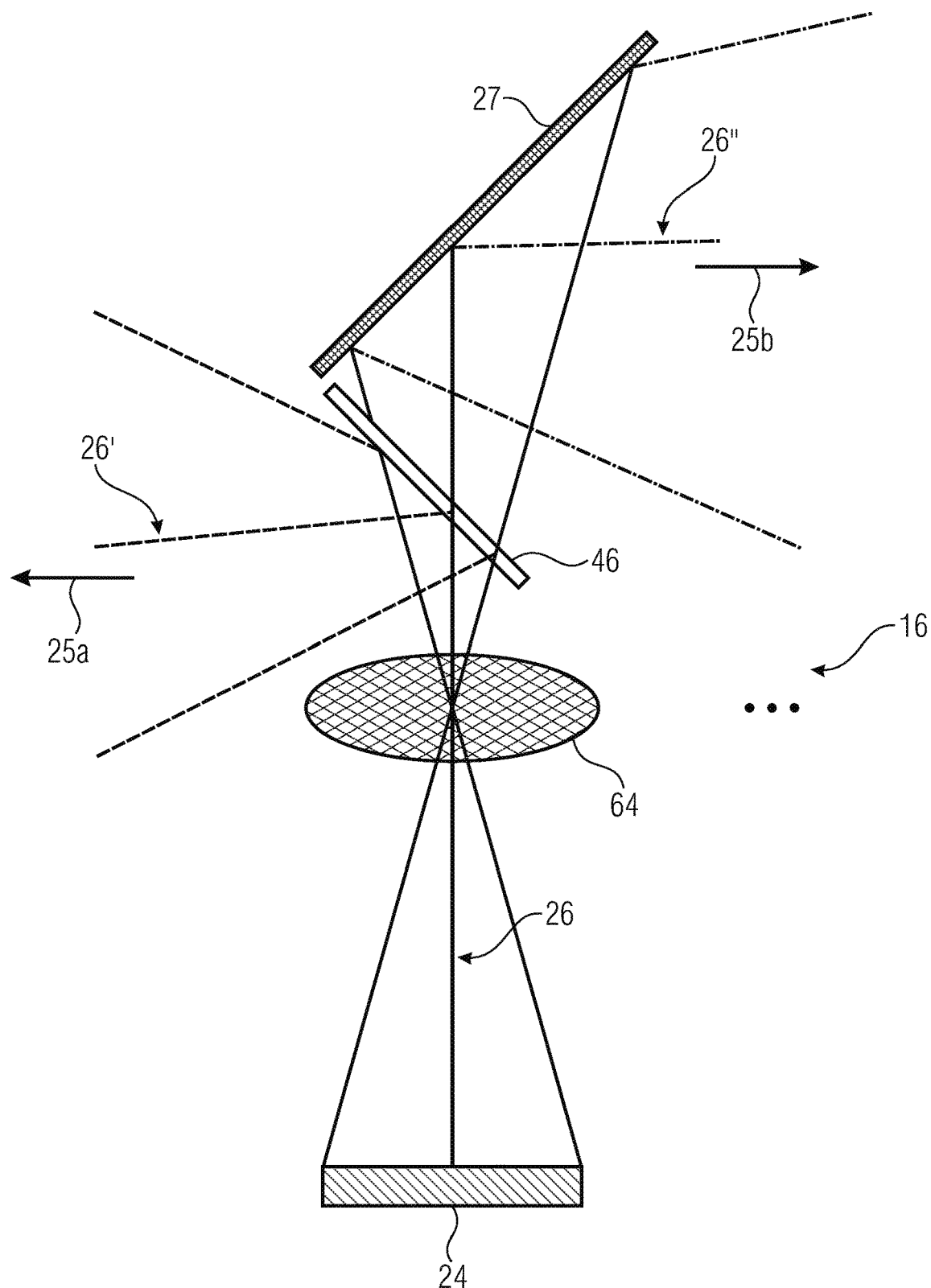
FIG. 2 shows a schematic side-sectional view of an optical channel of a multi-aperture imaging device according to an embodiment, including a mirror element.

FIG. 2 shows a schematic side-sectional view of a part of a multi-aperture imaging device 20, in particular of a course of the optical path 26 of an optical channel 16. As described in connection with the multi-aperture imaging device 10, the multi-aperture imaging device 20 is configured to, in a reflecting state of the beam-deflecting element 46, deflect the optical path 26 into a direction 25a. For this, FIG. 2 shows solid lines representing main beams at edges of a field of view (FOV) as well as in the central viewing direction. Dotted-dashed lines represent the deflected optical path 26', which is deflected into the direction 25a, both with respect to the edges and also with respect to the mean viewing direction. In the transparent state of the beam-deflecting element 46, the optical path 26 runs through or passes the beam-deflecting element 46. In a course from the image sensor region 24 through the optic 64 and through the beam-deflecting element 46, a mirror element 27 is arranged behind the beam-deflecting element 46, e.g., an electrically passive and/or mechanical mirror, configured to deflect the optical path 26 into the direction 25b in order to obtain the deflected optical path 26" whose main beams are illustrated at edges of the field of view and the mean viewing direction by the shape dash-dot-dot. For example, the mirror element 27 may be fixed, i.e., be rigid in relation to a substrate or a basal arrangement of the optical channel 16. Although some of the components, e.g., the optic 64 and/or the image sensor 12, may be movable based on a focusing device and/or optical image stabilization explained below, in order to influence the imaging of the respective partial field of view or the total field of view, however, the mirror element 27 may be fixedly arranged.

FIG. 2 shows only one optical channel 16, wherein, as described in connection with the multi-aperture imaging device 10, a plurality or multitude of optical channels may be arranged. Based on the orientation of the beam-deflecting element 46 and/or the mirror element 27, the directions 25a and 25b may have any orientation towards each other, e.g., along opposite directions, e.g. 180°. Each optical channel may be assigned a mirror element 27, wherein two or several optical channels may also be deflected by means of a mirror element 27.

In other words, different channels may have different deflection angles of the mirror and/or of the beam-deflecting element 46 in order to direct the optical paths in different partial fields of view of the total field of view. FIG. 2 shows a combination of a controllable or switchable mirror and of a classical mirror for beam deflection, e.g., along a face side or a world side of a mobile phone device. This arrangement may be simple, but may consume more installation space than the multi-aperture imaging device 10.

Figure 3:
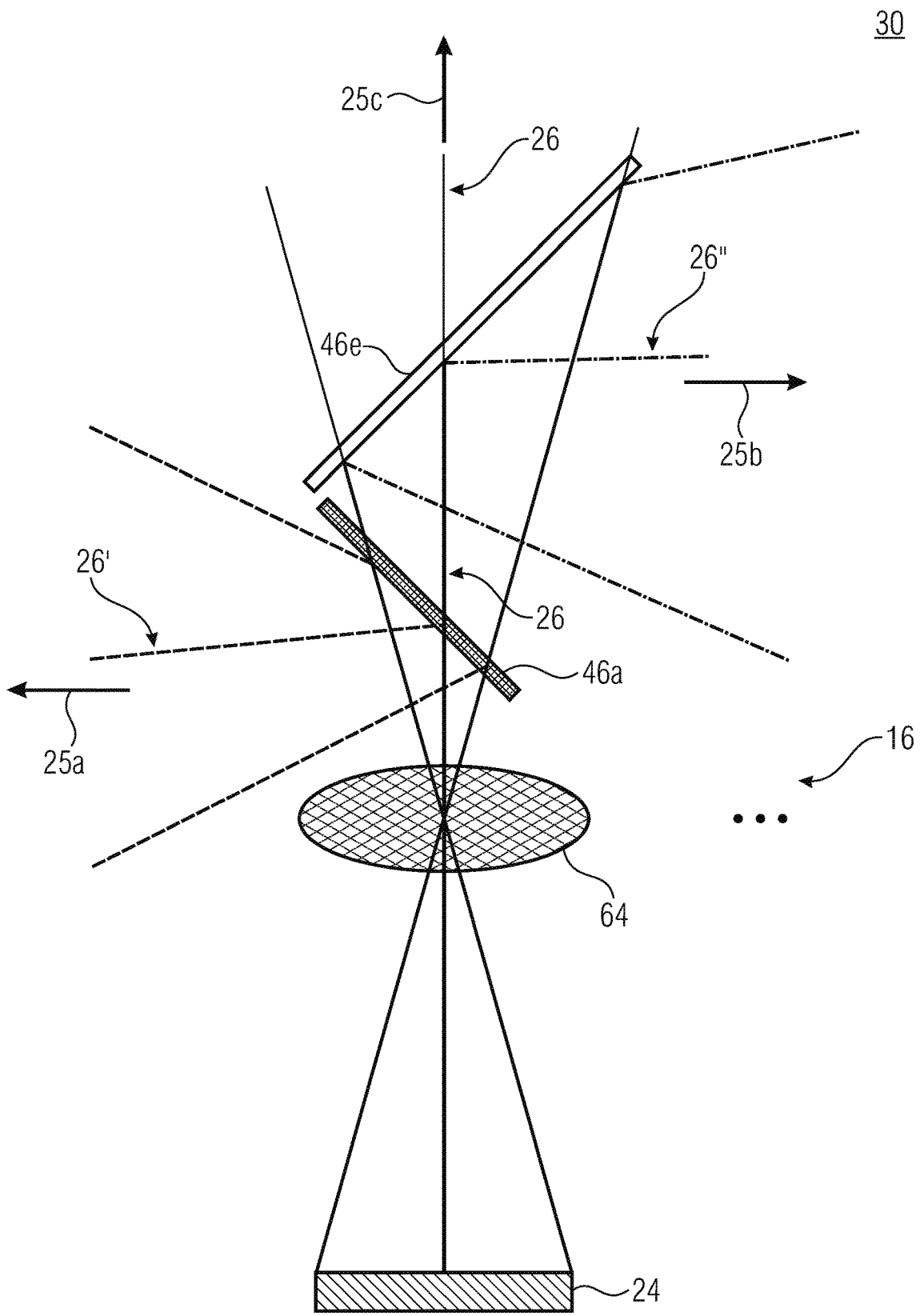
FIG. 3 shows a schematic top view of an optical channel of a multi-aperture imaging device according to a further embodiment, wherein two beam-deflecting elements are assigned to the optical channel.

FIG. 3 shows a schematic top view of a section of a multi-aperture imaging device 30 according to a further embodiment, wherein two beam-deflecting elements 46a and 46e are assigned to the optical channel 16. In comparison to the multi-aperture imaging device 20, the mirror element 27 may be implemented or replaced by a further controllable beam-deflecting element 46e. Thus, two or alternatively also several beam-deflecting elements 46a and 46e may be arranged in the course of the optical path. Controlling the beam-deflecting element 46a into the reflective state enables a deflection of the optical path 26 into the viewing direction 25a. Controlling the beam-deflecting element 46a into the transparent state enables the optical path 26 to strike the beam-deflecting element 46e and also an optional deflection of the optical path 26 into the viewing direction 25b by controlling the beam-deflecting elements 46e into the reflective state. Such an arrangement of the beam-deflecting elements 46a and 46e as well as possible further beam-deflecting elements enables the deflection of the optical path into the direction 25b by switching the beam-deflecting element 46a into the transparent state and the beam-deflecting element 46e into the reflecting state. Furthermore, the multi-aperture imaging device 30 comprises a third viewing direction 25c, e.g., an unchanged viewing direction between the optic 64 and the image sensor region 24, which may be obtained if both beam-deflecting elements 46a and 46e are switched into the transparent state. Thus, three locally different total fields of view may be captured. FIG. 3 only shows a schematic illustration of one optical channel 16, wherein, as described in connection with the multi-aperture imaging device 10, a plurality or multitude of optical channels 16 is arranged. Thus, in comparison to the multi-aperture imaging device 20, a higher number of viewing directions of the multi-aperture imaging device 30 may be obtained. The beam-deflecting elements 46a and 46e may be arranged in series one after another so that controlling the beam-deflecting element 46a into the transparent state enables to deflect or not deflect the optical path with the beam-deflecting element 46e.

Figure 4:
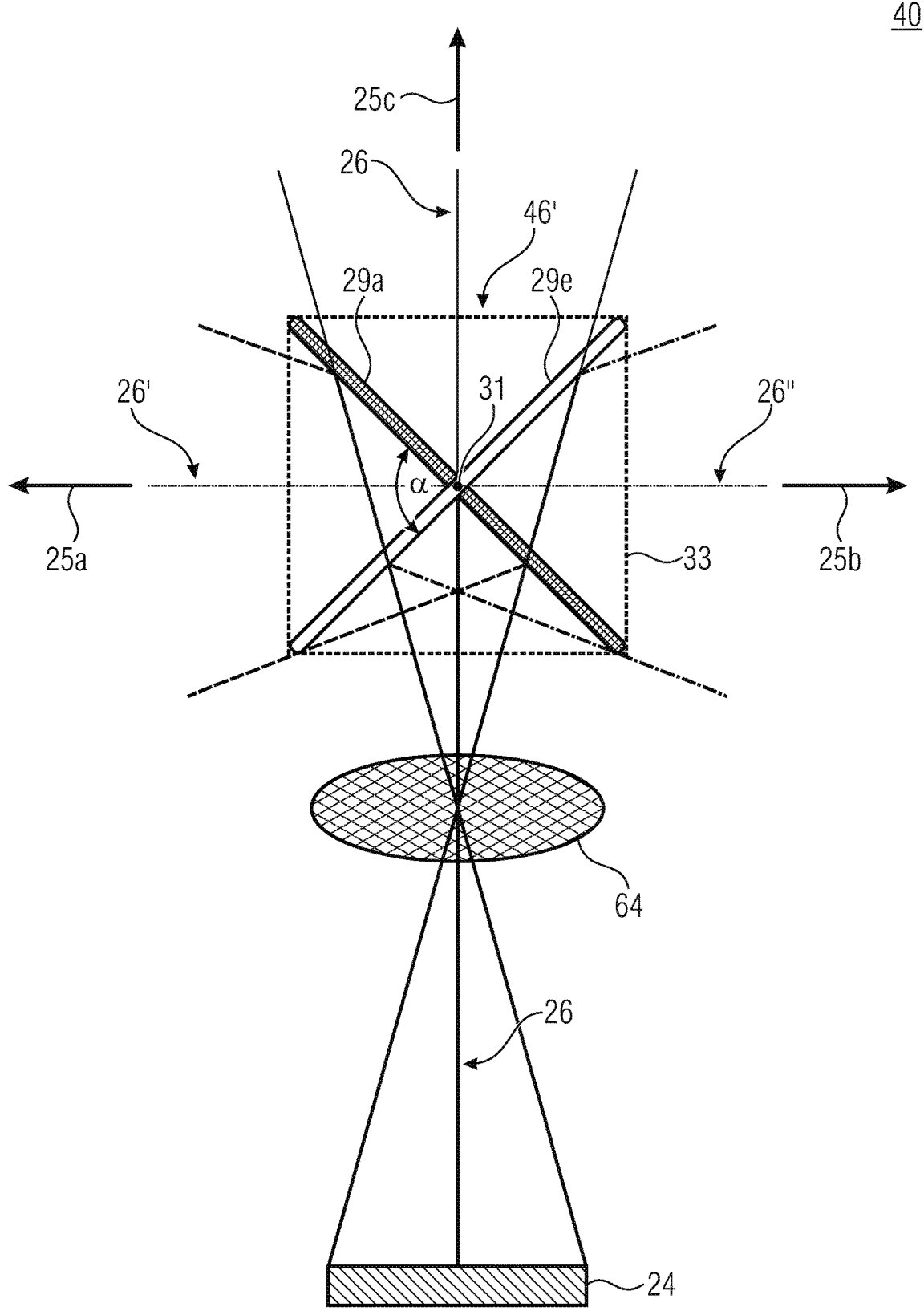
FIG. 4 shows a schematic top view of an optical channel of a multi-aperture imaging device according to a further embodiment, wherein the beam-deflecting element comprises two actively controllable surfaces that are inclined towards each other.

FIG. 4 shows a schematic top view of a section of a multi-aperture imaging device 40 according to a further embodiment, wherein, compared to the beam-deflecting element 46, a beam-deflecting element 46' comprises two actively controllable surfaces 29a and 29e that are inclined towards each other. Each of the controllable surfaces 29a and 29e is configured to be controllable into the transparent state and the reflecting state. Controlling may occur independently of the respective other controllable surface 29a and 29e.

The controllable surfaces 29a and 29e may be arranged in an inclined manner towards each other around an axis 31 having an angle α. The axis 31 may be arranged in parallel to a line-extension direction 65 of the multi-aperture imaging device 10, along which the optics of the optical channels 16a to 16d are arranged, e.g., with respect to lines in the array 14 of the multi-aperture imaging device 10. The angle α may have any value and may comprise, e.g., at least 10° and at most 170°, at least 30° and at most 150°, or at least 50° and at most 140°, e.g., 90°. For example, the angle α may be 90° in a tolerance range of 10%, 8% or 5%. The beam-deflecting element 46' having the two controllable surfaces 29a and 29e may also be understood as two controllable beam-deflecting elements at the same location according to the multi-aperture imaging device 30, which means that, instead of a serial connection, the deflection may also occur at a mutual location into the directions 25a or 25b or may possibly remain into the direction 25c.

For example, a control means may be configured to control one of the controllable surfaces 29a or 29e into the transparent state and to control the other controllable surface into the reflecting state, respectively.

As illustrated by the dotted outline, the beam-deflecting element 46' may include a beam-deflecting body 33 in which the controllable surface 29a and a further controllable surface 29e are arranged. For example, the controllable surfaces 29a and 29e may be diagonal surfaces of the beam-deflecting body 33. For example, the beam-deflecting body 33 may include the shape of a rectangle, such as a square, or comprise this shape.

In order to reduce or, if possible, avoid reflection losses and/or transmission losses, the controllable surfaces 29a and 29e may be formed such that they are polarization-independent, which may refer to both operating states, i.e., the reflective state and the transparent state. Furthermore, it may also be possible that the controllable surfaces comprise a plurality of pixels that are individually controllable so that all pixels may comprise the reflecting state or the transparent state or, alternatively, part of the pixels may comprise the transparent state and part of the pixels may simultaneously comprise the reflecting state.

Such a beam-deflecting element 46' may also be called X-cube since the controllable surfaces may be arranged in the form of an X with respect to each other. This may also be understood as a one-dimensionally crossed mirror in order to deflect the beam paths into the corresponding directions. In comparison to the multi-aperture imaging device 20, this may involve increased production effort and/or increased complexity, but allows for a smaller installation space requirement.

Figure 5:
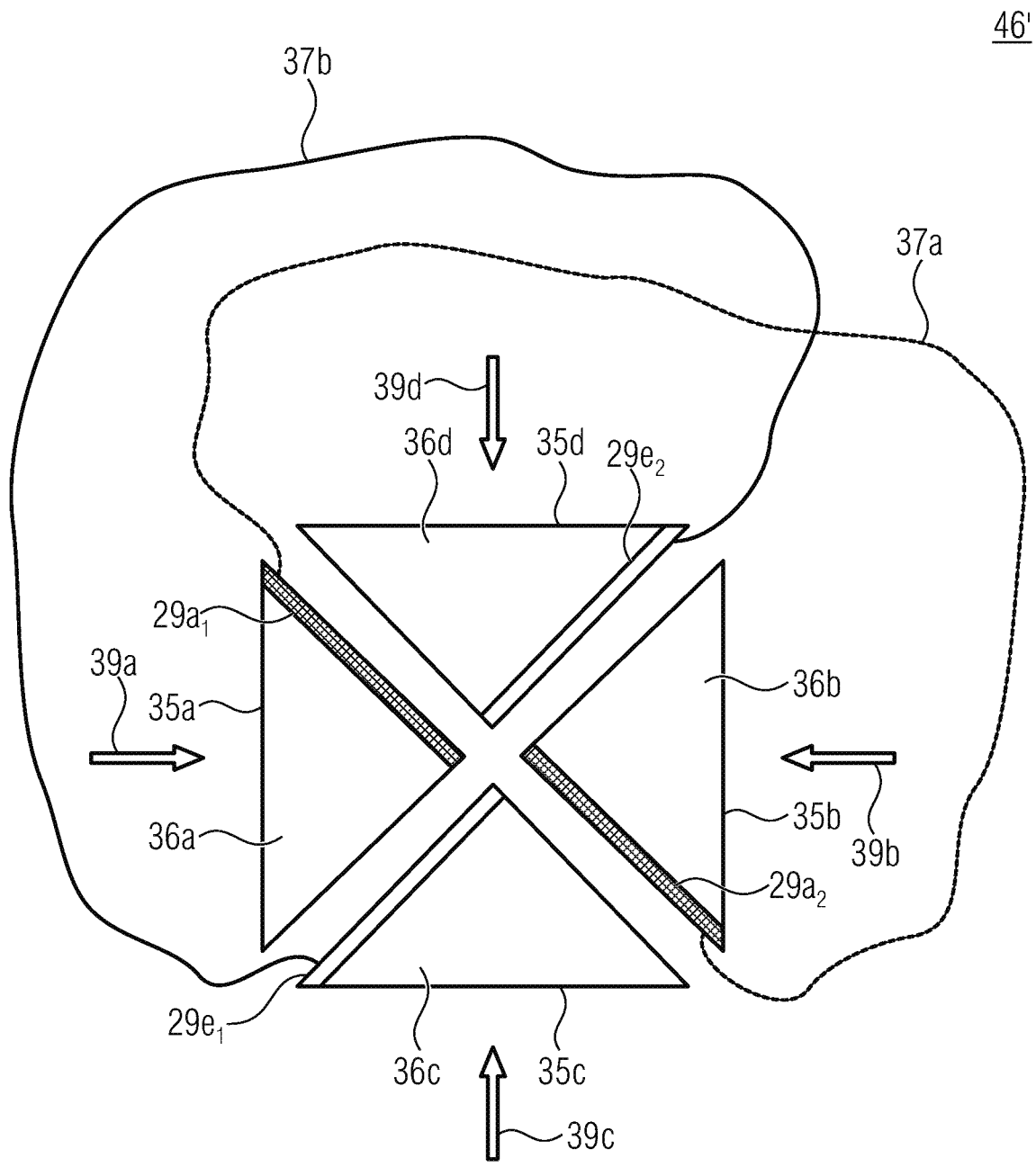
FIG. 5 shows a schematic side-sectional view of a possible implementation of the beam-deflecting element of FIG. 4 according to an embodiment.

FIG. 5 shows a schematic side-sectional view of a possible implementation of the beam-deflecting element 46' of FIG. 4. The controllable surfaces 29a and 29e of FIG. 4 may, e.g., be divided into two or more surface elements $29a_1$ and $29a_2$ as well as $29e_1$ and $29e_2$, i.e., include the surface elements or be formed thereof. The beam-deflecting element 46' may include a plurality, e.g. four, of prisms 35a to 35d which may jointly form the beam-deflecting body 33 of FIG. 4. For example, the prisms 35a to 35d may comprise a triangular basal shape. Alternatively, another shape is possible, e.g., if the beam-deflecting body 33 comprises a higher-number polygon shape such as a hexagon (into which a square may still be drawn and corresponding to the above discussions). Each of the surface elements $29a_1$, $29a_2$, $29e_1$ and $29e_2$ may be arranged at a side of one of the prisms 35a to 35d. Although FIG. 5 is illustrated such that each prism comprises exactly one surface element $29a_1$ to $29e_2$, several surface elements $29a_1$ to $29e_2$ may be arranged at a prism. For example, it would be conceivable to arrange the surface element $29e_1$ at the prism 35a such that the surface element $29a_1$ is arranged at the illustrated side and the surface element $29e_1$ is arranged at the adjacent tangential surface. For example, the prism 35c may be implemented such that it is formed without an active surface and serves as a filling body and/or base body for the other surfaces, for example.

Electric connections 37a and 37b may connect the surface elements $29a_1$ and $29a_2$, and $29e_1$ and 29e of a controllable surface 29a and 29e, respectively, so that the surface elements of a controllable surface may be mutually controlled. By temporarily or permanently joining the prisms 35a to 35d along illustrated arrows 39a to 39d, the beam-deflecting body 33 may be obtained. Immersive-gluing the prisms may be advantageous for joining the same so that the smallest possible number or advantageously no air gaps remain inside of the beam-deflecting body 33, but a monolithically acting body is obtained.

In other words, the X-cube may be a joint connection of glass prisms having an angle of 90°, which comprise a suitable electric connection and an introduced arrangement of active surfaces of a switchable liquid crystal mirror. Thus, assigning the beam-deflection may be obtained purely by electric control. The prisms are illustrated in a side-sectional view. For example, a top view may illustrate a polygonal view such as a square view. The prisms may or should be arranged with a high accuracy towards each other in order to reduce or avoid transition effects between the surface elements.

Figure 6A:
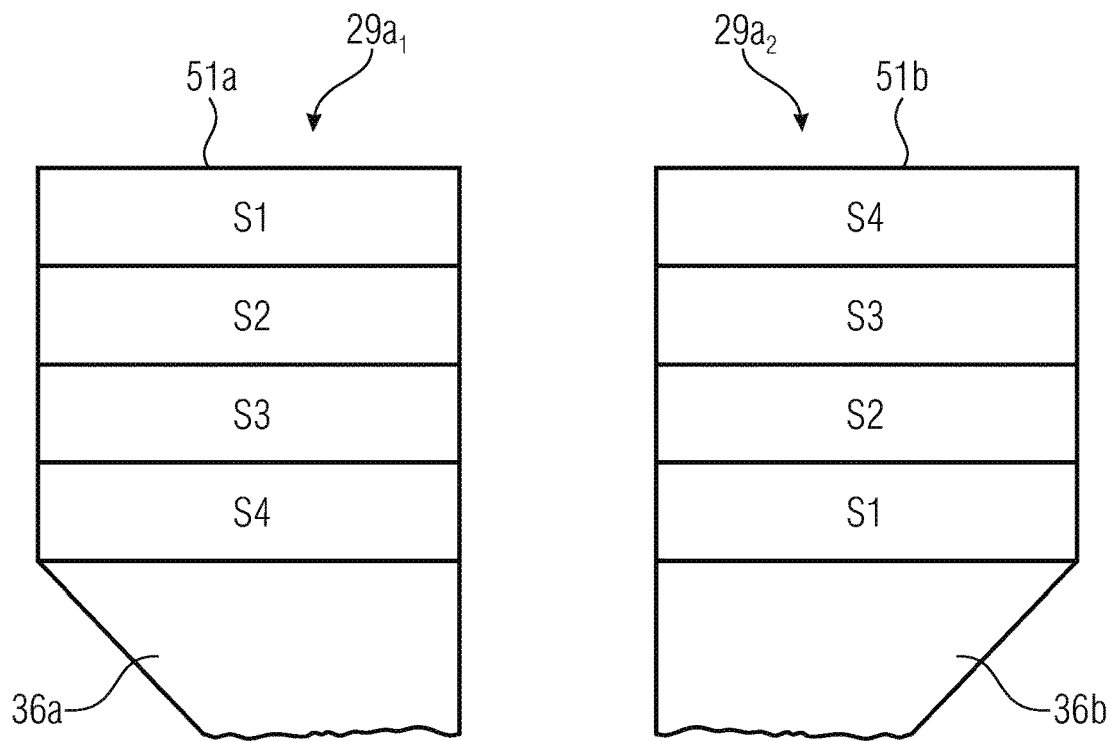
FIG. 6a shows a schematic side-sectional view of layer stacks including four layers which at least partially form surface elements of a controllable surface, according to an embodiment.

FIG. 6a shows a schematic side-sectional view of a layer stack 51a including layers S1 to S4, e.g., at least partially forming surface element $29a_1$. Furthermore, a layer stack 51b is illustrated, which also includes the layers S1 to S4 and may at least partially form the surface element $29a_2$. An order of the layers S1, S2, S3 and S4 may be complimentary with respect to each other between the layer stacks 51a and 51b, wherein this may particularly refer to the materials of the layers S1 to S4. Thus, e.g., a transparent state of the main surface 29a and 29e may substantially be transparent in both directions due to the materials used for the active surfaces 29a and 29e or the order of the same, however, it may be slightly different along different viewing directions.

Figure 6B:
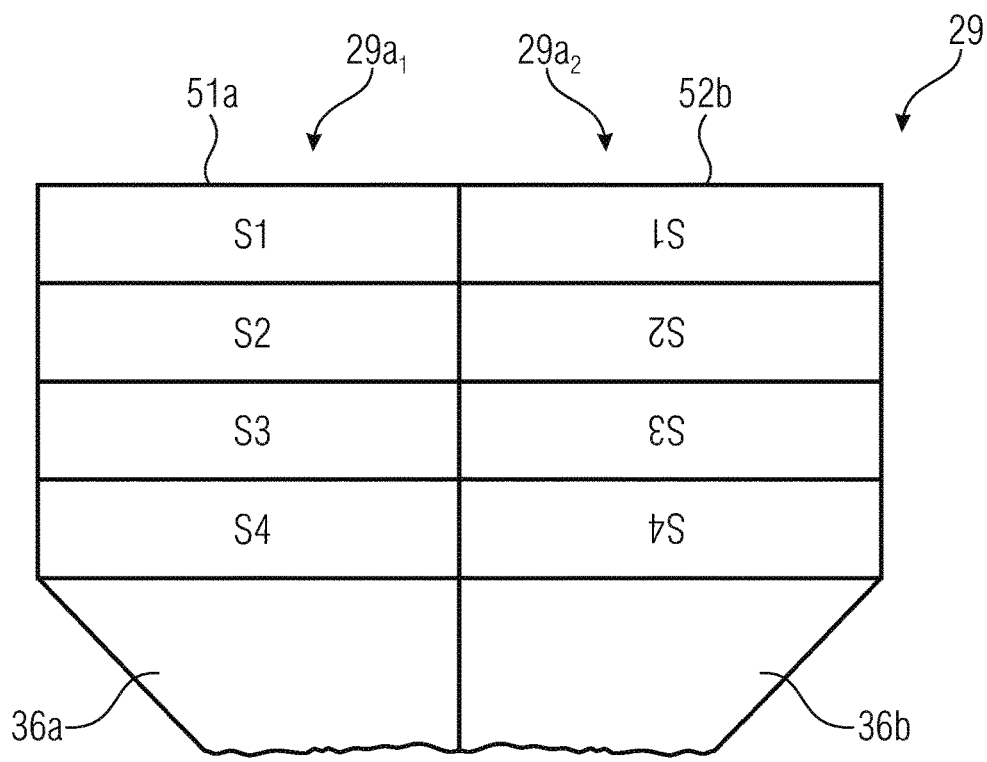
FIG. 6b shows an assemblage of the layer stacks of FIG. 6a according to an embodiment.

FIG. 6b shows a joint connection of the layer stacks 51a and 51b, e.g., as may be obtained by joining the prisms 35a to 35d along the arrows 39a to 39d in FIG. 5. When considering FIG. 5, it may be seen that a deposition of an identical layer sequence at substrate bodies 36a to 36d, e.g., including a transparent material such as transparent plastic or glass, of the prisms 35a and 35b may lead to the fact that, due to the orientation of the prisms 35a and 35b towards each other, the layer sequences illustrated in FIG. 6 would be non-uniform across a layer course after joining the prisms 35a and 35b. Although this is within the scope of the embodiments described herein, FIG. 6a shows a possibility to obtain a uniform characteristic along the layers.

FIG. 6b shows the layer stacks 51a and 52b in an orientation after an arrangement at the prisms 35a and 35b and an assembly carried out according to FIG. 5. The substrate bodies 36a and 36b may be joined such that the layers S1 to S4 as well as the substrate bodies 36a and 36b have little or no inclusions or flaws. It is shown that the layers within the active surface 29 may be uniform across the surface element $29a_1$ and $29a_2$. This enables obtaining a uniform optical characteristic across the course of the surface. In other words, a layer system of the LC mirror may be adapted to avoid that the beam-deflecting element comprises a substrate body only on one side and operates against air on the other. The adjustment enables high refractive indices of the beam-deflecting element on both sides.

Although FIGS. 6a and 6b relate to the joint connection of the surface elements $29a_1$ and $29a_2$, this may also be done for the surface elements $29e_1$ and $29e_2$ without restrictions. Although the layer stacks 51a and 51b are described including four layers S1-S4, the layer stacks may also comprise a different number of layers such as 2, 3, 5 or more.

Figure 7:
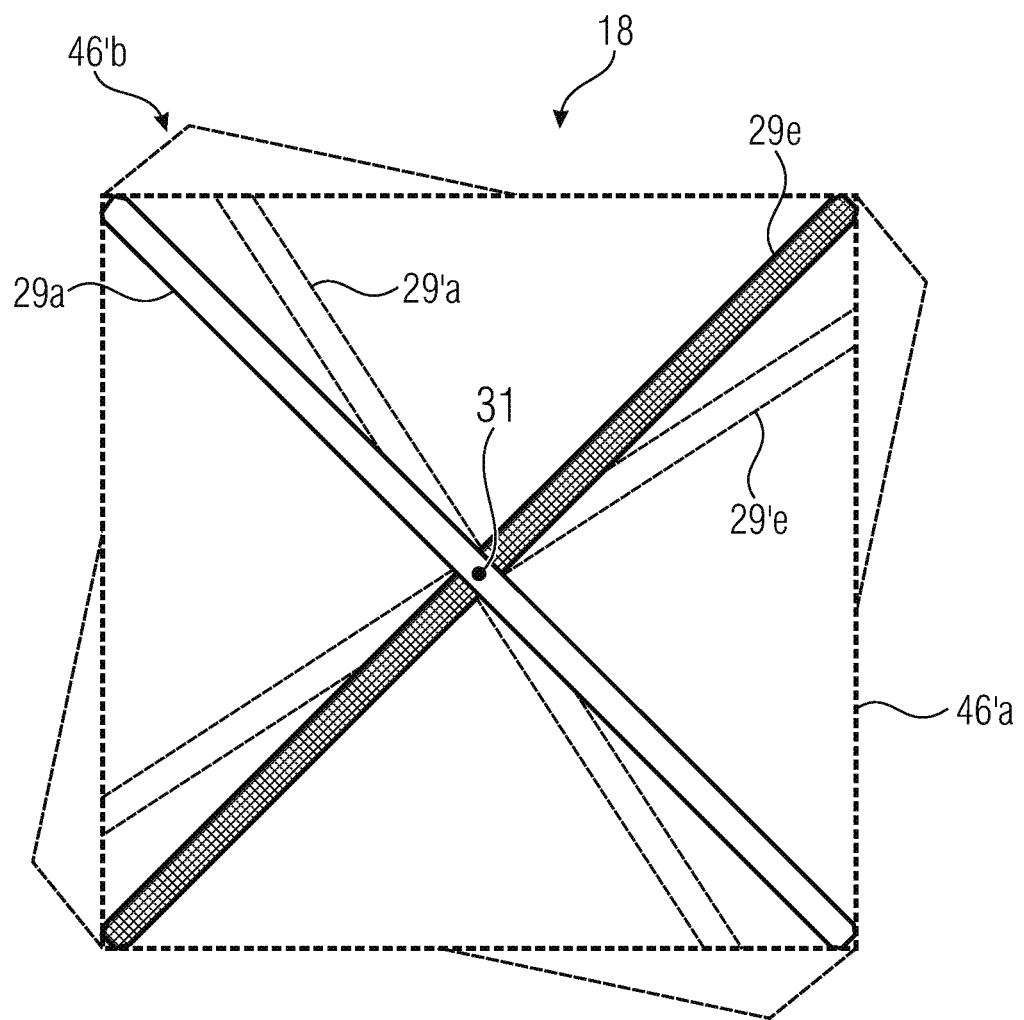
FIG. 7 shows a schematic side-sectional view of a beam-deflecting means according to an embodiment including two beam-deflecting elements.

FIG. 7 shows a schematic side-sectional view of the beam-deflecting means 18, including the beam-deflecting elements 46'a and 46'b. The beam-deflecting elements 46'a and 46'b may each be formed according to the discussions in connection with FIG. 4 and/or FIG. 5 and/or FIG. 6. Identical controllable surfaces 29a and 29'a, and 29e and 29'e of different beam-deflecting elements 46'a and 46'b, respectively, may be arranged in the beam-deflecting means 18 in an inclined manner towards each other. The different inclination enables deflecting the optical channels into different directions and into a direction towards different partial fields of view. Although the different inclination is described to be perpendicular to the axis 31 and, consequently, to the line-extension direction 65, it is also possible that the respective identical surfaces 29a and 29'a, and 29e and 29'e are also inclined towards each other along the axis 31 so that a two-dimensionally different deflection is obtained by the beam-deflecting means 18. As is illustrated by the dotted lines, it is possible to arrange the beam-deflecting elements 46'a and 46'b rotated towards each other around the axis 31 in order to obtain the inclination of the controllable surfaces 29a and 29'a, and 29e and 29'e.

In other words, different optical channels comprises slightly different orientations and/or rotations of the beam-deflecting bodies 33 in order to direct the optical paths towards the intended partial fields of view of the total field of view.

In the following, some advantageous implementations of herein-described multi-aperture imaging devices are explained. In particular, reference is made to a focusing means for focusing the images, an optical image stabilization and an electronic image stabilization. Although these three implementations are described in connection with the multi-aperture imaging device 80, it is further pointed that the focusing means, the optical image stabilizer and the electronic image stabilizer may be realized individually or in any combination with each other since each of the described means may be implemented individually in order to obtain the respective module-inherent advantage.

The above-explained elements for beam deflection 27 and/or 46 and/or 46' may be optically connected to each other in series in any combination, which means that, e.g., at least one beam-deflecting element 46 and/or 46' may be combined at one or several locations with a mirror element and/or a beam-deflecting element 46.

Figure 8:
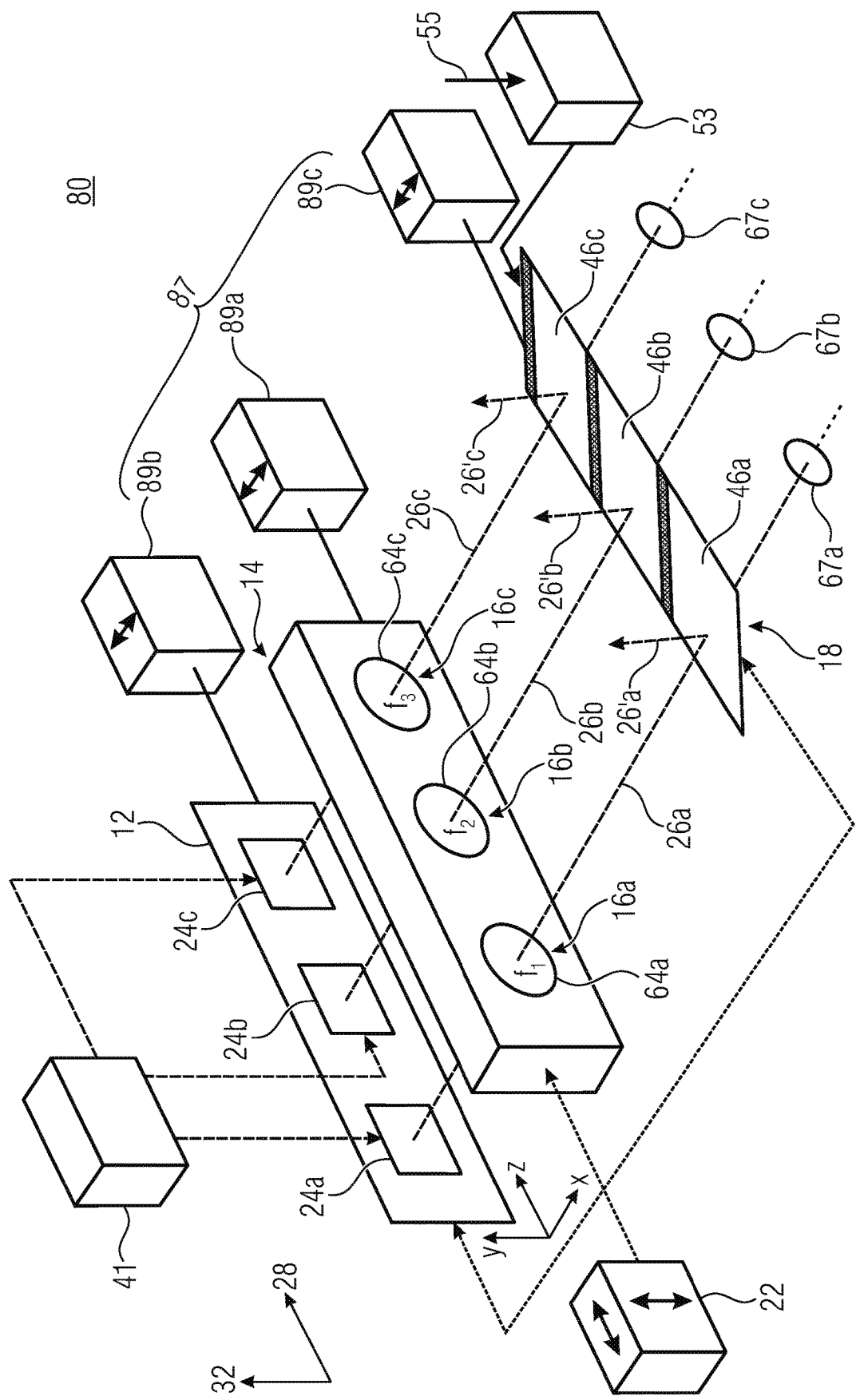
FIG. 8 shows a schematic perspective view of a multi-aperture imaging device according to an embodiment, wherein the array of optical channels includes three optical channels.

FIG. 8 shows a schematic perspective view of a multi-aperture imaging device 80, wherein the array 14 includes, as an example and without any restricting effect, three optical channels 16a, 16b and 16c. The multi-aperture imaging device 80 includes a focusing means 87 which may include one or several actuators 89a, 89b and/or 89c. A first actuator 89a to 89c may be mechanically connected to the array 14 or at least an optic thereof, to the image sensor 12 and/or to the beam-deflecting means 18 in order to change a relative movement between the individual components along a course of the optical paths between the image sensor 12 and the beam-deflecting means 18. The focusing means 87 is advantageously configured to execute a relative movement between the image sensor 12 and the array 14 along the extension direction of the optical paths 26a to 26c described with x so that the beam-deflecting means 18 may remain unmoved. By changing a distance between the array 14, or the at least one optic, and the image sensor 12, a focus of the multi-aperture imaging device 80 may be set. This means that, although the optics 64a, 64b and 64c are illustrated such that they are arranged at a mutual carrier, in order to be moveable together with the array 14, at least one of the optics 64a-c, alternatively or additionally at least one image sensor region 24a-c and/or at least one beam-deflecting region 46a-c may be moved individually by the focusing means 97 in order to set a focus for the respective optical channel so that channel-individual focusing is also possible. This may be particularly advantageous if the beam-deflecting region 46a-c comprises a refractive power or a so-called "optical power," i.e., including a slight focusing function, e.g., due to slightly curved outer surfaces or connected lenses. Optical power is also understood to be dioptric power, refractive power, focusing power or convergence power and describes a degree or extent with which a lens, a mirror or another optical system converges or diverges light.

Alternatively, or additionally, it is possible that total fields of view and/or partial fields of view arranged along different viewing directions, e.g., transparent beam-deflecting elements 46a-c for a first viewing direction and reflecting beam-deflecting elements 46a-c for a second viewing direction, are different. Thus, a different size, a different aspect ratio between an extension along a first image direction and an extension along a second viewing direction and/or a changed relative position of the partial fields of view in the respective total field of view may be implemented. For example, optical elements such as lenses or filters may be arranged.

Optical elements arranged between the image sensor and the beam-deflecting element (e.g., "in front" of a beam-deflection) may act together for several viewing directions, e.g., the optics 64a-c. The multi-aperture imaging device 80 or another multi-aperture imaging device described herein may include one or several optical elements 67a-c that are arranged "behind" a beam-deflecting element 46a, 46b or 46c so that, in the course of the optical path 26a-c or 26'a-c, the respective beam-deflecting element 46a-c is be arranged between the optical element 67a-c and the image sensor 12. Although the optical elements 67a-c are illustrated as channel-induvial optical elements, wherein each optical channel 16a-c is assigned one of the elements 67a-c, at least one optical element may also act for several optical channels. Alternatively or additionally, a different optical characteristic or number of the optical elements 67a-c may be implemented for the different optical channels. Although the optical elements are illustrated to be arranged along the undeflected optical path 26a-c, alternatively or additionally, optical elements may also be arranged along at least one undeflected optical path 26'a, 26'b and/or 26'c. With respect to the optical elements 67a-c, the optical path 26a-c may be influenced along a first viewing direction of the multi-aperture imaging device 80 by the optical element 67a-c and may not be influenced by the optical element 67a-c along a second viewing direction. For example, the optical elements 67a-c may advantageously be lightweight diffraction lenses for an enlargement of a field of view in the respective parts of the optical paths so that the partial fields of view and therefore also the total fields of view may comprise a different size along the different viewing directions.

Alternatively or additionally to the optical elements 67a-c, the same may be any other optical elements for adapting the capturing such as filters or the like. An possibly implemented autofocus mechanism may be adapted to the different optical characteristics of the respective viewing direction and may update or adapt the function accordingly.

Alternatively or additionally to the previous possibilities of the adjustment of the total field of view, an adjustment of the refractive power may also be implemented within the active surface of one or several beam-deflecting elements 46a-c. This means that an adjustment may be carried out by a viewing direction deflection with the beam-deflecting element. At least one of the beam-deflecting elements 46a-c may be configured to execute a mutually different optical adjustment of the passing deflected or undeflected optical channel 16a-c in the transparent state and in the reflecting state. For example, the controllable surface of the beam-deflecting element may provide in the reflecting state and in the transparent state mutually different focusing or defocusing of the optical channel 16a-c or another optical function. For example, this may be implemented in the layers S1-S4, or their substrates, of the controllable surface explained in connection with FIGS. 6a and 6b. Alternatively or additionally, the controllable surface may comprise a curvature for focusing or defocusing. When using the beam-deflecting element 46', it is within the context of inventive implementations that the different active surfaces 29a and 29e carry out different adjustments in the optical channels, which means that the controllable surfaces 29a and 29e may be different. By adjusting along a viewing direction and/or by different adjustments along different viewing directions, different sizes of the field of view may be obtained on the world side (viewing direction of a device that points away from a user) and on the user side (opposite viewing direction). This may be achieved within certain limits by different optical powers, i.e., refractive powers in the optical channels or mirrors. In each of these directions in or in front of the mirror or deflecting elements, an update of elements along the optical axis may be implemented for refocusing.

Based on manufacturing inaccuracies and/or based on a different implementation of the optics 64a to 64c, the optics 64a to 64c may comprise different focal lengths $f_1$, $f_2$ and/or $f_3$. These different focal lengths may lead to the fact that, in particular, upon a mutual movement of the optics, e.g., during focusing, the adjustments in the images of the image sensor regions 24a to 24c may have different effects. This effect may also occur if the beam-deflecting means 18 is moved within the context of focusing relatively to the array 14 and/or the image sensor 12. The multi-aperture imaging device 80 may include an optical image stabilizer 22 and/or an electronic image stabilizer 41 in order to compensate for different image scales in the image channels and shaking of the multi-aperture imaging device 80 with respect to the scene. For example, the optical image stabilizer 22 may be configured to act for one individual optical channel, for at least two optical channels, for a multitude of optical channels and for all optical channels 16a to 16c and, therefore, their optical paths, e.g., by relatively moving individual image sensor regions 24a to 24c, individual optics 64a to 64c and/or individual beam-deflecting regions 46a to 46c with respect to each other. Groups of image sensor regions 24, optics 64 and/or beam-deflecting regions 46 may also be moved, e.g., by mechanical connection to a mutual carrier. In this way, all components of the respective element may also be moved, which means that the image sensor 12 may be moved in order to move all image sensor regions, the array 14 may be moved in order to move all optics 64, and/or the beam-deflecting means 18 may be moved in order to move all beam-deflecting regions 46. By generating a translational relative movement between the image sensor 12, the array 14 and the beam-deflecting means 18 along a first image direction 28 and a second image direction 32, e.g., running along the main extension directions of image sensors 24a to 24c, the optical image stabilization may be obtained. Advantageously, the optical image stabilizer 22 is configured to move the image sensor 12 and the array 14 relative to each other along the image directions 28 and 32. A simple possibility of implementation is to contact the optical image stabilizer 22 and the array 14 so that only electrically passive elements are moved and electric connections in the image sensor 12 may remain without movement. A movement of the array 14 may occur in a y/z plane, e.g., to avoid a rotation of the beam-deflecting means 18, which is possible regardless, for the image stabilization in y, which is sometimes to be avoided due to the design and the dimensions, or mass, of the beam-deflecting means 18 and/or the multi-aperture imaging device 80.

The electronic image stabilizer 41 may be connected to the image sensor 12 and may be configured to obtain image information from the image sensor regions 24a to 24c. The electronic image stabilizer may be configured to act for one, two, a multitude of or all optical paths 26a to 26c of the optical channels 16a to 16c by manipulating the image information in the image sensor regions 24a to 24c. The electronic image stabilization may also be carried out along the image axes 28 and 32. In a configuration of the electronic image stabilizer 41 such that it acts for two or more optical paths 26a to 26c, the electronic image stabilizer 41 may be configured to carry out the electronic image stabilization in a channel-individual manner for each optical channel. The electronic image stabilizer 41 may be configured to carry out the channel-individual electronic image stabilization by evaluating each individual image in the image sensor regions 24a to 24c, or to provide the electronic image stabilization such that an alignment with another optical channel, or another image, is carried out. In this way, e.g., by the optical image stabilizer 22, an optical image stabilization which acts globally, i.e., for two, several or all optical channels 16a to 16c, may be obtained, however, which acts differently due to the different focal lengths f1 to f3 in each of the optical channels so that an ideal and largest possible optical image stabilization may solely be obtained in one of the optical channels 16a to 16c, while deviations from the ideal value may be obtained in the other optical channels due to focal length differences. The electronic image stabilizer 41 may be configured to electronically stabilize in a referenced manner the other optical channels which have deviations onto the optical channel that is optically image-stabilized in high quality. Thus, the optical channel that is optically image-stabilized in high quality may serve as a reference channel. This means that electronic image stabilization may also be omitted in the reference channel.

The electronic image stabilization in the optical channels that are different from the reference channel may be carried out based on a set functional correlation. The focal lengths $f_1$ to $f_3$ as well as the effects in the multi-aperture imaging device 80 that result from the optical image stabilizer 22 and/or other movements may be invariable so that, based on a movement that is obtained through the optical image stabilizer 22 or the focusing means 87 between the image sensor 12, the array 14 and the beam-deflecting means 18, for example, the effect of the functional correlation is known in advance due to the geometric arrangement in the multi-aperture imaging device 80. The electronic image stabilizer 41 may be configured to carry out the channel-individual electronic image stabilization in each channel according to the set functional correlation.

According to an embodiment, the multi-aperture imaging device 80 includes the focusing means for channel-individually setting a focus of the multi-aperture imaging device. For example, the actuator 89a is configured to provide a channel-individual relative movement between the optics 64a to 64c and the image sensor 12. The electronic image stabilizer 41 is configured to act for one, two, a multitude of or all optical paths 26a-c of the optical channels 16a-c and the provide the image stabilization along the image axes 28 and 32.

The multi-aperture imaging device 80 may further comprise a control means 53 configured to control the beam-deflecting elements 46a to 46c individually or mutually into the transparent or reflecting state. For this, the control means 53 may obtain a user input 55 such as a command for a viewing direction change.

In connection with the multi-aperture imaging device 80, it has been explained that focal lengths of optics may differ from each other based on manufacturing deviations. Alternatively, a multi-aperture imaging device may also comprise optics that comprise a desired deviation of the focal length with respect to each other. A desired deviation is understood to be a deviation in which a first focal length of a first optic differs from a second focal length of a second optic by at least 10%, at least 20% or at least 30%.

Figure 9:
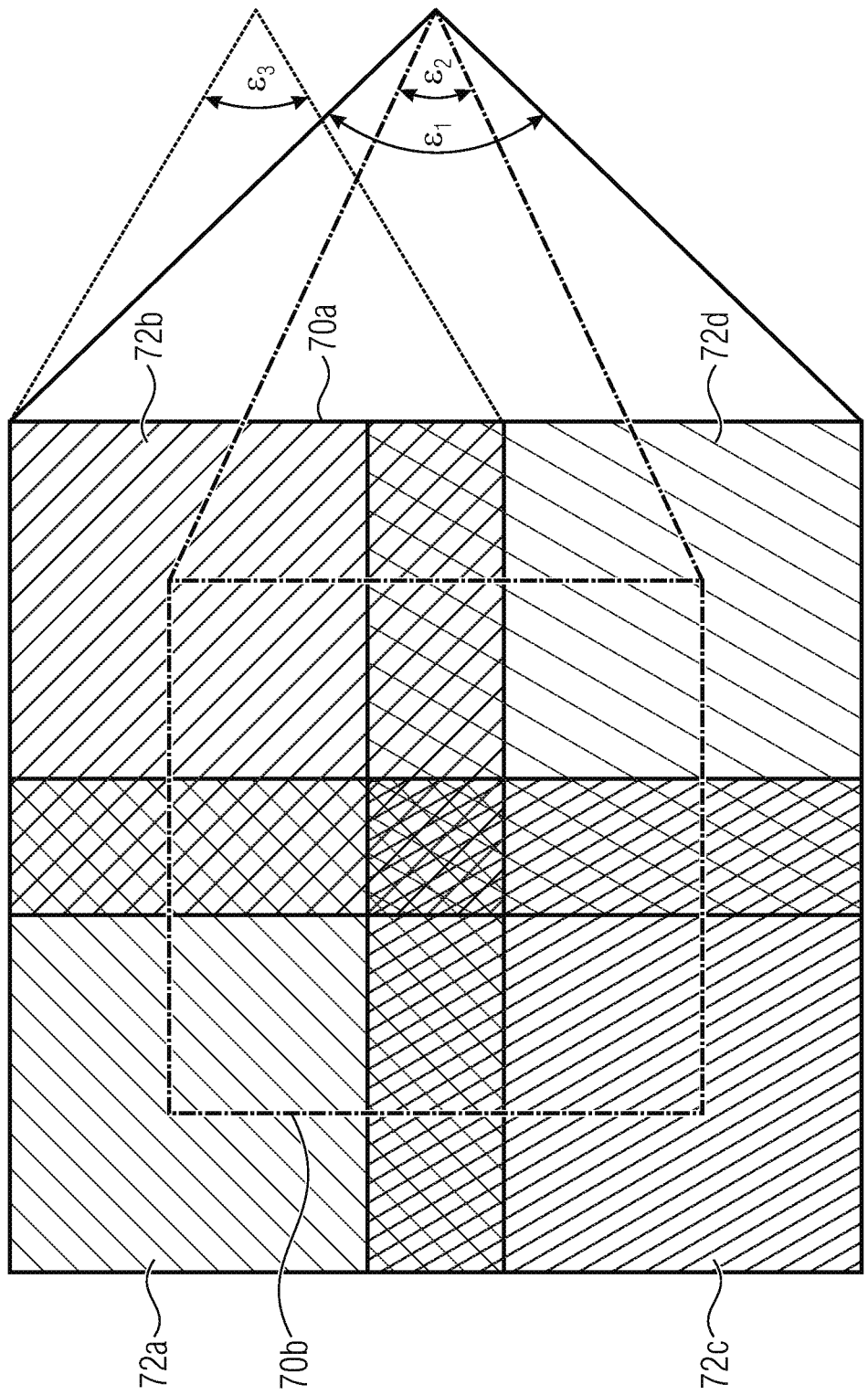
FIG. 9 shows a schematic view of two total fields of view which may be captured with a multi-aperture imaging device according to embodiments described herein.

FIG. 9 shows a schematic view of two total fields of view 70a and 70b that may be captured with a multi-aperture imaging device according to embodiments described herein. For example, such a multi-aperture imaging device comprises five optical channels of which four optical channels are substantially formed in an identical manner. Such optical channels may comprise an opening angle $\eta_3$, wherein the individual images captured in this manner may be combined to the total field of view 70a overall comprising the opening angle $\eta_1$. Now, a fifth optic may comprise the above-described difference in focal length and may be formed to,e.g., comprise an opening angle $\eta_2$ which is larger than the opening angle $\eta_3$ and/or possibly smaller than the opening angle $\eta_1$. For example, the optical channel comprising the opening angle $\eta_2$ may be configured to entirely cover the total field of view 70b. Optical channels comprising optics having the opening angles $\eta_2$ and/or $\eta_3$ may be combined to groups of optical channels, wherein group includes at least one optical channel. Although the total field of view 70b is described such that it is captured by a single optical channel, according to other embodiments, it is also possible for the total field of view 70b to be captured by a group of at least two optical channels.

The total field of view 70b may at least partially or also entirely overlap with the total field of view 70a. Alternatively, it is also possible for the total fields of view 70a and 70b to at least partially differ from each other, e.g., if the optical paths are deflected into different directions. The total field of view 70b may be part of the total field view 70a, i.e., an incomplete section thereof. Compared to the total field of view 70a, the total field of view 70b may comprise a smaller opening angle, which may lead to the imaged section of the object region in the total field of view 70b being smaller when compared to the total field of view 70a. With the same sensor area, this means that a larger section of the object region is imaged onto an image sensor are of the same size, compared to the partial fields of view 72a to 72d. This means that an opening angle $\eta_1$ of the total field of view 70a may be larger than an opening angle $\eta_2$ of the total field of view 70b, wherein the angles may be in direct correlation to the focal length of the optics. Compared to the combination of the optics for capturing the total field of view 70a, the optic for capturing the total field of view 70b may be a tele-objective or a zoom objective, or at least provide a corresponding function, while, reversely, the combination of the optics for capturing the total field of view 70a compared to the optic for capturing the total field of view 70b may be a wide angle objective, or at least provide a corresponding function.

Figure 10:
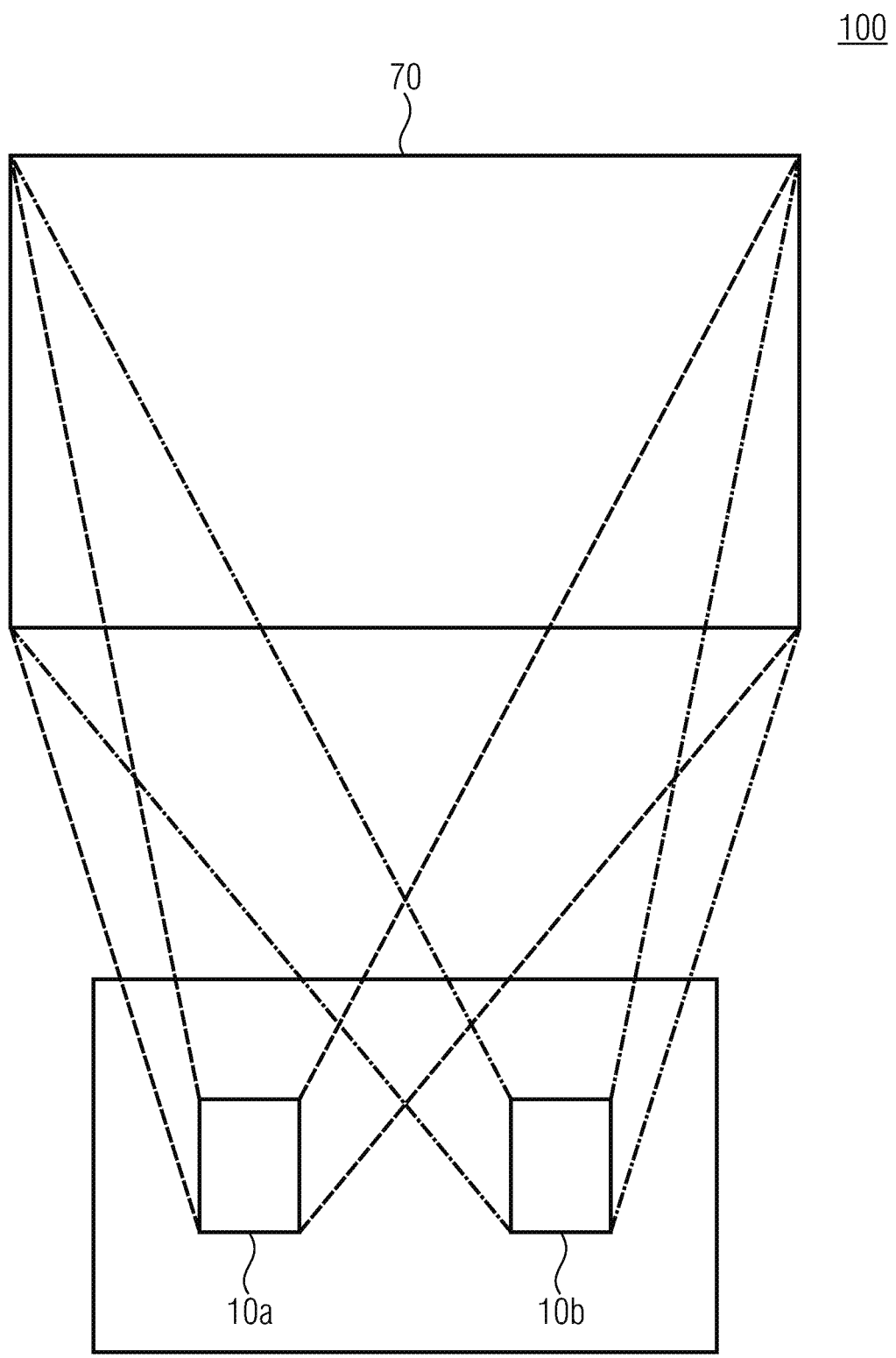
FIG. 10 shows a schematic perspective view of an imaging system according to an embodiment.

FIG. 10 shows a schematic perspective view of an imaging system 100 including a first multi-aperture imaging device 10a and a second multi-aperture imaging device 10b that are configured together to capture the total field of view 70 in a stereoscopic manner. The capturing regions of the multi-aperture imaging devices 10a and 10b may entirely overlap with each other so that the total field of view 70 is entirely captured in a stereoscopic manner. Alternatively, the capturing regions may solely overlap partially so that stereoscopic capturing is only carried out in the overlapping region. Alternatively, another above-described multi-aperture imaging device such as the multi-aperture imaging device 20, 30 and/or 40 may be arranged instead of the multi-aperture imaging device 10a or 10b. Although the imaging device 100 is described such that it comprises two multi-aperture imaging devices 10a and 10b, any other number of multi-aperture imaging devices may alternatively be arranged, e.g., three, four, five or more.

For example, the imaging system 10 may be a mobile means such as tablet or a mobile telephone, e.g., a smartphone. Particularly, in mobile means or devices such as telephones, movable parts may be undesired due to the system stability, service life, the mechanical shock sensitivity, the wear or the like. Embodiments described herein enable minimizing the use of mechanically movable parts at least at such locations where they may be replaced by immovable parts. Depending on the consideration, this may even occur by compromising other parameters, e.g., complexity or cost, which means that it may be acceptable to obtain a slightly more complex system if movable parts may be avoided. The embodiments described herein describe an arrangement wherein hinged mirrors are substituted by an arrangement of electrically switchable mirrors, e.g., in the form of an array. In the array, the individual switchable mirrors may be put in rotation with respect to each other in order to obtain the subdivision of the field of view. Combinations of switchable liquid crystal mirrors having normal (static) mirrors as well as arrangements of two switchable liquid crystal mirrors may be implemented. For example, two switchable liquid crystal mirrors may be arranged on prisms of 90° and a combination thereof may take place in such a way that two crossed complimentarily switchable mirror surfaces arranged at 90° to each other and intersecting each other along a line are created, which may also be called X-cube.

Figure 11:
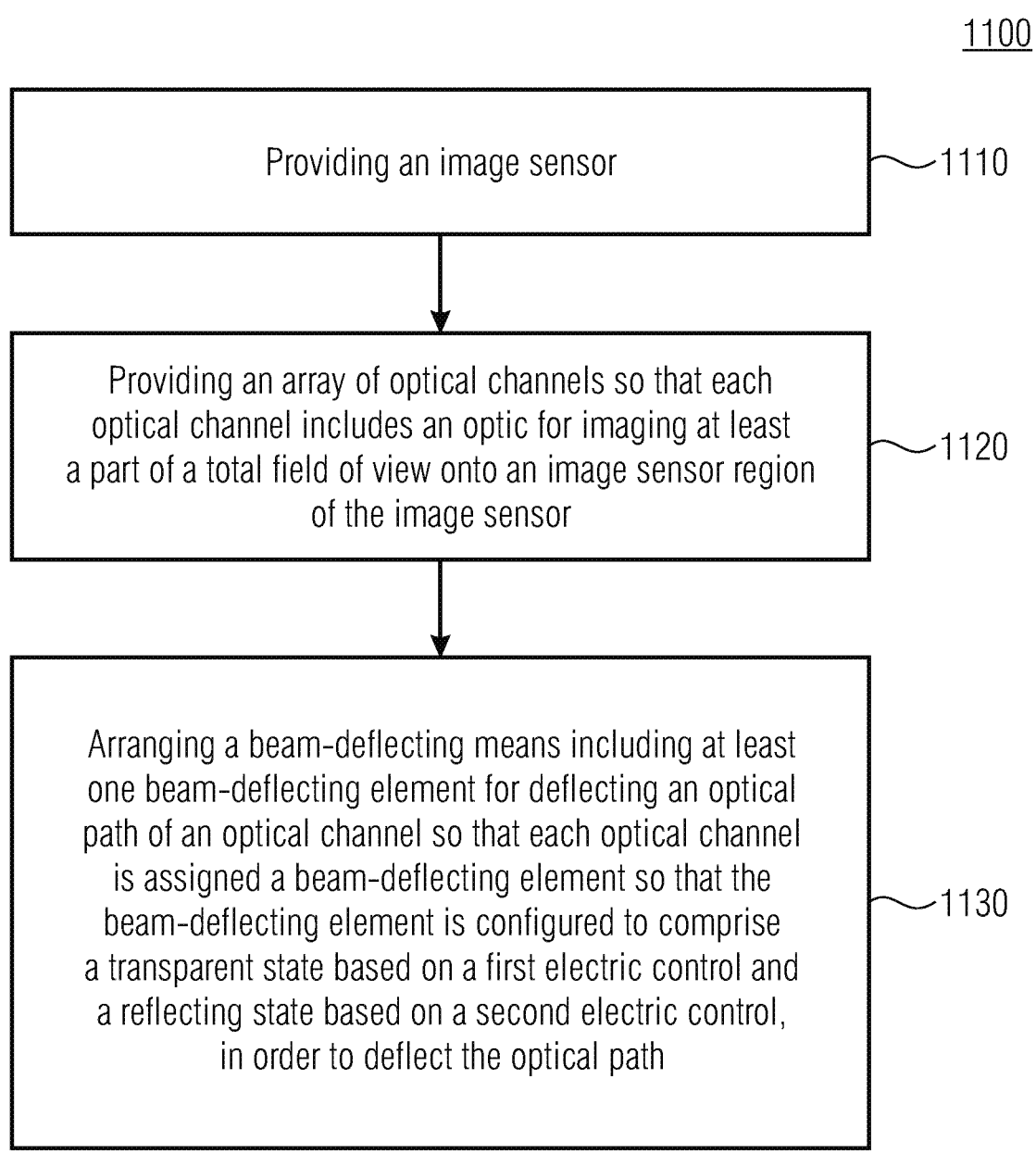
FIG. 11 shows a schematic flow diagram of a method for providing a multi-aperture imaging device according to an embodiment.

FIG. 11 shows a schematic flow diagram of a method 1100 for providing a multi-aperture imaging device according to an embodiment. Step 1110 comprises providing an image sensor. Step 1120 comprises providing an array of optical channels such that each optical channel includes an optic for imaging at least a part of a total field of view onto an image sensor region of the image sensor. Step 1130 comprises arranging a beam-deflecting means including at least one beam-deflecting element for deflecting an optical path of an optical channel such that each optical channel is assigned a beam-deflecting element so that the beam-deflecting element is configured to comprise a transparent state based on a first electric control and a reflecting state based on a second electric control in order to deflect the optical path.

The advantages of the embodiments described herein, amongst others, are that no additional mechanically moved parts are necessary in the imaging optical path for switching the viewing direction of the camera array between a face side and a world side of the mobile device. Multi-aperture imaging systems or multi-aperture imaging devices according to embodiments described herein may comprise a linear channel arrangement and a small installation size without comprising mechanically moved deflection mirrors for switching the viewing direction between the face side and the world side.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A multi-aperture imaging device comprising:
   an image sensor;
   an array of optical channels, wherein each optical channel comprises an optic for imaging at least a part of a total field of view onto an image sensor region of the image sensor; and
   a beam-deflector comprising at least one beam-deflecting element with a controllable surface for deflecting an optical path of an optical channel, wherein each optical channel is assigned a beam-deflecting element;
   wherein the beam-deflecting element is configured to comprise a transparent state of the controllable surface based on a first electric control and comprise a reflecting state of the controllable surface based on a second electric control in order to deflect the optical path.

2. The multi-aperture imaging device according to claim 1, wherein the beam-deflector comprises at least one mirror element, wherein each optical channel is assigned a mirror element arranged such that the beam-deflector deflects the optical path with the mirror element in the transparent state of the controllable surface.

3. The multi-aperture imaging device according to claim 1, wherein the beam-deflecting element is a first beam-deflecting element and wherein each optical channel is assigned a second beam-deflecting element of the beam-deflector arranged such that the optical path of the optical channel strikes the second beam-deflecting element in the transparent state of the controllable surface of the first beam-deflecting element.

4. The multi-aperture imaging device according to claim 1, wherein the controllable surface is a first controllable surface, wherein the beam-deflecting element comprises a second controllable surface that is controllable into the transparent state and the reflecting state, wherein the first and the second controllable surfaces are arranged at an angle of at least 10° and at most 170° towards each other.

5. The multi-aperture imaging device according to claim 4, wherein the first controllable surface is arranged in a first diagonal surface of a beam-deflecting element body and wherein the second controllable surface is arranged in a second diagonal surface of the beam-deflecting element body.

6. The multi-aperture imaging device according to claim 5, wherein the first controllable surface and the second controllable surface are arranged in an inclined manner towards each other around an axis parallel to a line-extension direction of the array.

7. The multi-aperture imaging device according to claim 4, wherein the angle comprises a value of 90° within a tolerance range of 10%.

8. The multi-aperture imaging device according to claim 4, wherein the beam-deflecting element comprises a first, a second, a third and a fourth prism comprising a triangular basal shape, wherein the first controllable surface is formed comprising a first surface element and a second surface element, wherein the second controllable surface is formed comprising a third surface element and a fourth surface element, wherein each of the first to fourth surface elements is arranged at a prism surface of one of the first to fourth prisms and the prisms are arranged such that the first and the second surface elements form the first controllable surface and the third and the fourth surface elements form the second controllable surface.

9. The multi-aperture imaging device according to claim 8, wherein the first surface element comprises a first layer stack which provides switching between the transparent state and the reflecting state, wherein an order of layers in the first layer stack is complimentary to an order of layers in a second layer stack of the second controllable surface element.

10. The multi-aperture imaging device according to claim 1, wherein the beam-deflector comprises a plurality of beam-deflecting elements arranged along a line-extension direction of the array, wherein the controllable surfaces of the plurality of beam-deflecting elements are arranged in an inclined manner towards each other in the beam-deflector so that the optical channel are deflected into different partial fields of view of a mutual total field of view.

11. The multi-aperture imaging device according to claim 1, wherein the beam-deflector comprises a plurality of identically formed beam-deflecting elements along a line-extension direction along which the optical channels are arranged in the array, wherein the plurality of beam-deflecting elements are arranged along the line-extension direction in a rotated manner towards each other.

12. The multi-aperture imaging device according to claim 1, further comprising a focus element comprising at least one actuator for setting a focus of the multi-aperture imaging device, wherein the actuator is configured to provide a relative movement between at least one of the optics and the image sensor.

13. The multi-aperture imaging device according to claim 1, wherein a first optic of a first optical channel comprises a first focal length, and wherein a second optic of a second optical channel comprises a second focal length, wherein the first focal length deviates from the second focal length by at least 10%.

14. The multi-aperture imaging device according to claim 13, wherein a first group with at least one optical channel comprising an optic with the first focal length is configured to image a first total field of view, and wherein a second group with at least one optical channel comprising an optic comprising the second focal length is configured to image a second total field of view.

15. The multi-aperture imaging device according to claim 1, wherein the beam-deflecting element is configured to carry out a different optical adjustment of the optical channels in the transparent state and in the reflecting state.

16. The multi-aperture imaging device according to claim 15, wherein the beam-deflecting element comprises a controllable surface that is controllable into the transparent state and the reflecting state, wherein the controllable surface provides a different focusing or defocusing of the optical channel in the reflecting state and in the transparent state.

17. The multi-aperture imaging device according to claim 1, wherein the beam-deflecting element is arranged between the image sensor and an optical element so that the optical path is influenced by the optical element along a first viewing direction of the multi-aperture imaging device, and is not influenced by the optical element along a second viewing direction.

18. The multi-aperture imaging device according to claim 1, further comprising an optical image stabilizer acting together for one, two, a multitude of or all optical paths of the optical channels for an optical image stabilization along a first image axis and a second image axis by generating a translational relative movement between the image sensor and the array, wherein the translational relative movement runs in parallel to a first image axis and a second image axis of an image captured by the multi-aperture imaging device.

19. The multi-aperture imaging device according to claim 1, further comprising an electronic image stabilizer acting for one, two, a multitude of or all optical paths of the optical channels for an electronic image stabilization along a first image axis and a second image axis.

20. The multi-aperture imaging device according to claim 19, wherein the electronic image stabilizer is configured to execute an image stabilization in a channel-individual manner for each optical channel.

21. The multi-aperture imaging device according to claim 20, wherein the electronic image stabilizer is configured to stabilize an image of an optical channel with respect to an optically stabilized reference image in another optical channel.

22. The multi-aperture imaging device according to claim 19, wherein the electronic image stabilizer is configured to execute the channel-individual electronic image stabilization in each channel according to a set functional correlation depending on a relative movement between the image sensor, the array and the beam-deflector.

23. The multi-aperture imaging device according to claim 1, further comprising:
   a focus element comprising at least one actuator for channel-individually setting a focus of multi-aperture imaging device, wherein the actuator is configured to provide a channel-individual relative movement between the optics and the image sensor; and an electronic image stabilizer acting for one, two, a multitude of or all optical paths of the optical channels for an image stabilization along a first image axis and a second image axis.

24. The multi-aperture imaging device according to claim 1, further comprising a controller for alternately controlling the beam-deflecting element into the transparent state and into the reflecting state based on a user input.

25. The multi-aperture imaging device according to claim 1, configured to detect a total field of view at least partially in a stereoscopic manner.

26. A multi-aperture imaging device comprising:
an image sensor;
an array of optical channels, wherein each optical channel comprises an optic for imaging at least a part of a total field of view onto an image sensor region of the image sensor; and
a beam-deflector comprising at least one beam-deflecting element with a controllable surface for deflecting an optical path of an optical channel, wherein each optical channel is assigned a beam-deflecting element;
wherein the beam-deflecting element is configured to comprise a transparent state of the controllable surface based on a first electric control and comprise a reflecting state of the controllable surface based on a second electric control in order to deflect the optical path;
wherein the controllable surface is a first controllable surface, wherein the beam-deflecting element comprises a second controllable surface that is controllable into the transparent state and the reflecting state, wherein the first and the second controllable surfaces are arranged at an angle of at least 10° and at most 170° towards each other; and
wherein the beam-deflecting element comprises a first, a second, a third and a fourth prism comprising a triangular basal shape, wherein the first controllable surface is formed comprising a first surface element and a second surface element, wherein the second controllable surface is formed comprising a third surface element and a fourth surface element, wherein each of the first to fourth surface elements is arranged at a prism surface of one of the first to fourth prisms and the prisms are arranged such that the first and the second surface elements form the first controllable surface and the third and the fourth surface elements form the second controllable surface.

27. A method for providing a multi-aperture imaging device, comprising:
providing an image sensor;
providing an array of optical channels so that each optical channel comprises an optic for imaging at least a part of a total field of view onto an image sensor region of the image sensor; and
arranging a beam-deflector comprising at least one beam-deflecting element comprising a controllable surface for deflecting an optical path of an optical channel so that each optical channel is assigned a beam-deflecting element;
so that the beam-deflecting element is configured to comprise a transparent state of a controllable surface based on a first electric control and to comprise a reflecting state of the controllable surface based on a second electric control in order to deflect the optical path.

28. A method for providing a multi-aperture imaging device, comprising:
providing an image sensor;
providing an array of optical channels so that each optical channel comprises an optic for imaging at least a part of a total field of view onto an image sensor region of the image sensor; and
arranging a beam-deflector comprising at least one beam-deflecting element comprising a controllable surface for deflecting an optical path of an optical channel so that each optical channel is assigned a beam-deflecting element;
so that the beam-deflecting element is configured to comprise a transparent state of a controllable surface based on a first electric control and to comprise a reflecting state of the controllable surface based on a second electric control in order to deflect the optical path;
so that the controllable surface is a first controllable surface, wherein the beam-deflecting element comprises a second controllable surface which is controllable into the transparent state and the reflecting state, wherein the first and the second controllable surfaces are arranged at an angle of at least 10° and at most 170° towards each other; and
so that the beam-deflecting element comprises a first, a second, a third and a fourth prism comprising a triangular basal shape, wherein the first controllable surface is formed including a first surface element and a second surface element, wherein the second controllable surface is formed including a third surface element and a fourth surface element wherein each of the first to fourth surface elements is arranged at a prism surface of one of the first to fourth prisms, and wherein the prisms are arranged such that the first and the second surface elements form the first controllable surface and the third and the fourth surface elements form the second controllable surface.

* * * * *